(12) United States Patent
Park et al.

(10) Patent No.: US 12,464,185 B2
(45) Date of Patent: Nov. 4, 2025

(54) METHOD AND APPARATUS FOR SYNCHRONIZING AUDIO AND VIDEO SIGNALS OF MULTIMEDIA CONTENT

(71) Applicant: Samsung Electronics Co., Ltd., Gyeonggi-do (KR)

(72) Inventors: Jinyoung Park, Gyeonggi-do (KR); Misun Kim, Gyeonggi-do (KR); Kwangyong Choi, Gyeonggi-do (KR); Sangheon Kim, Gyeonggi-do (KR); Mira Seo, Gyeonggi-do (KR); Hyomin Oh, Gyeonggi-do (KR); Yeunwook Lim, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 312 days.

(21) Appl. No.: 18/094,123

(22) Filed: Jan. 6, 2023

(65) Prior Publication Data

US 2023/0156265 A1    May 18, 2023

Related U.S. Application Data

(63) Continuation of application No. PCT/KR2022/000922, filed on Jan. 18, 2022.

(30) Foreign Application Priority Data

Jan. 18, 2021    (KR) .......................... 10-2021-007010

(51) Int. Cl.
*H04N 21/43*     (2011.01)
*G06F 3/04855*   (2022.01)
*H04N 21/81*     (2011.01)

(52) U.S. Cl.
CPC ..... *H04N 21/4307* (2013.01); *G06F 3/04855* (2013.01); *H04N 21/8173* (2013.01)

(58) Field of Classification Search
CPC ........ G06F 3/165; G06F 3/162; G06F 3/0482; G06F 16/40
(Continued)

(56) References Cited

U.S. PATENT DOCUMENTS 8,208,069 B2    6/2012  Suzuki
8,325,930 B2   12/2012  Kim et al.
(Continued)

FOREIGN PATENT DOCUMENTS

JP    2009-130821    6/2009
KR   1020050079347   8/2005
(Continued)

OTHER PUBLICATIONS

PCT/ISA/210 Search Report issued on PCT/KR2022/000922, May 6, 2022, pp. 5.
(Continued)

*Primary Examiner* — Alexander Krzystan
(74) *Attorney, Agent, or Firm* — The Farrell Law Firm, P.C.

(57) ABSTRACT

An electronic device may include a display and at least one processor configured to execute an application, play multimedia content, obtain information associated with playing the multimedia content, identify a synchronization parameter for synchronization, based on the obtained information, output a UI generated based on the obtained information and the synchronization parameter to the display, and synchronize the audio signal and the video signal.

20 Claims, 32 Drawing Sheets

Electronic Device

(58) Field of Classification Search
USPC .......................................................... 700/94
See application file for complete search history.

(56) References Cited

U.S. PATENT DOCUMENTS

| | | | |
|---|---|---|---|
| 9,558,787 B2 | 1/2017 | Woodman et al. | |
| 9,578,210 B2 | 2/2017 | Lee et al. | |
| 2012/0172118 A1 | 7/2012 | Shimamura et al. | |
| 2013/0169869 A1* | 7/2013 | Demoulin | H04N 21/4722 348/515 |
| 2016/0173931 A1 | 6/2016 | Eber et al. | |
| 2019/0014435 A1 | 1/2019 | Baijal et al. | |
| 2019/0045309 A1 | 2/2019 | Ell et al. | |
| 2019/0149874 A1 | 5/2019 | Lau et al. | |
| 2020/0076631 A1 | 3/2020 | Yoon et al. | |
| 2021/0344974 A1 | 11/2021 | Yu | |
| 2023/0089356 A1* | 3/2023 | Morsy | G06F 3/04847 700/94 |
| 2023/0161551 A1* | 5/2023 | Lang | G06F 3/165 700/94 |

FOREIGN PATENT DOCUMENTS

| | | |
|---|---|---|
| KR | 1020060109081 | 10/2006 |
| KR | 10-2010-0060717 | 6/2010 |
| KR | 10-097031 | 7/2010 |
| KR | 10-0970731 | 7/2010 |
| KR | 10-2011-0120402 | 11/2011 |
| KR | 10-1986995 | 7/2018 |
| KR | 1020190106986 | 9/2019 |
| KR | 10-2020-0051061 | 5/2020 |
| KR | 1020200063676 | 6/2020 |
| KR | 10-2140612 | 7/2020 |

OTHER PUBLICATIONS

PCT/ISA/237 Written Opinion issued on PCT/KR2022/000922, May 6, 2022, pp. 4.
European Search Report dated Mar. 7, 2024 issued in counterpart application No. 22739833.6-1208, 9 pages.
European Search Report dated May 19, 2025 issued in counterpart application No. 22739833.6-1207, 6 pages.
KR Notice of Patent Grantdated Aug. 28, 2025 issued in counterpart application No. 10-2021-007010, 5 pages.

* cited by examiner

AVSDB (AV Sync Database)

(a) Play Information Table

| ID | Device ID | Player ID | Sync VAlue (msec) | Unit (msec, frame) |
|---|---|---|---|---|
| PI1 | D1 | P1 | 200 | msec |

(b) Audio Device Table

| ID | Type | Address | Sync value (msec) | Latency : Maximum Autio Latency (msec) |
|---|---|---|---|---|
| D1 | BT | XX.XX.XX | 200 | 200 |
| D2 | Car | YY.YY.YY | 192 | 192 |
| D3 | Glass | ZZ.ZZ.ZZ | 187 | 187 |

(c) Player Table

| ID | Unique Information (Identification) | Possible Minimum value (msec) | Possible Maximum Value(msec) |
|---|---|---|---|
| P1 | com.google.youtube | -200 | 125 |
| P2 | com.google.youtube | -190 | 128 |

(d) Special content table

| ID | Unique Information (Identification) | Device ID | Player ID | Synchronization Value Difference |
|---|---|---|---|---|
| C1 | http://youtube.com/a1b2c3 | D1 | P1 | -49 |
| C2 | http://youtube.com/a1b2c3 | D1 | P2 | -48 |

(e) Auditory characteristic Table

| Sensitivity Level |
|---|
| High |

FIG.7

METHOD AND APPARATUS FOR SYNCHRONIZING AUDIO AND VIDEO SIGNALS OF MULTIMEDIA CONTENT

CROSS-REFERENCE TO RELATED APPLICATIONS

This application is a Bypass Continuation application of International Application No. PCT/KR2022/000922, which was filed on Jan. 18, 2022, and is based on and claims priority under 35 U.S.C. § 119 to Korean Patent Application No. 10-2021-0007010, which was filed in the Korean Intellectual Property Office on Jan. 18, 2021, the entire disclosure of each of which is incorporated herein by reference.

BACKGROUND

1. Field

The disclosure relates generally to a method and an electronic device for synchronizing an audio signal and a video signal of multimedia content.

2. Description of Related Art

An electronic device may exchange data with an external electronic device through short-range wireless communication (e.g., Bluetooth, Wi-Fi, or near-field communication (NFC)) even though not physically connected to the external electronic device. An electronic device may transmit multimedia content being played on the electronic device to an external electronic device to which the electronic device has established a connection for communication, and then play the multimedia data on external electronic device using wireless communication.

When an electronic device and an external electronic device are wirelessly connected, an audio signal of multimedia content being played in the external electronic device may have a delay relative to a video signal of the multimedia content in encoding, transmission, reception, and decoding processes. The delay may cause a mismatch between an audio output and a video output of the multimedia content played on the external electronic device, degrading a user viewing experience.

SUMMARY

The disclosure has been made to address at least the above-mentioned problems and/or disadvantages and to provide at least the advantages described below.

An aspect of the disclosure is to synchronize an audio signal and a video signal of multimedia content played through an external electronic device, thereby preventing a mismatch between an audio output and a video output.

Another aspect of the disclosure is to provide an electronic device and method thereof that synchronize audio and video signals according to a synchronization value optimized for multimedia content being played, thereby improving usability of an application by a user.

Another aspect of the disclosure is to provide an electronic device and method thereof that provide a synchronization value of multimedia content in consideration of auditory characteristics of a user, thereby improving usability of an application by the user.

Another aspect of the disclosure is to provide an electronic device and method thereof that output a user interface (UI) to a display without overlapping multimedia content being played, thereby improving user convenience.

Another aspect of the disclosure is to provide an electronic device and method thereof, wherein after synchronizing an audio signal and a video signal of multimedia content, a playback time of the multimedia content may be returned to a time when a user was watching, thereby improving user convenience.

In accordance with an aspect of the disclosure, an electronic device is provided, which includes a display and at least one processor configured to execute an application, play multimedia content through the application, obtain information associated with playing multimedia content, identify a synchronization parameter for synchronizing audio and video signals of the multimedia content, based on the obtained information, output a UI generated based on the obtained information and the synchronization parameter to the display, and synchronize the audio signal and the video signal based on a user input to the UI.

In accordance with another aspect of the disclosure, an operating method is provided for an electronic device including a display. The method includes executing an application, playing multimedia content through the application, obtaining information associated with playing the multimedia content, identifying a synchronization parameter for synchronizing an audio signal and a video signal of the multimedia content, based on the obtained information, outputting a UT generated based on the obtained information and the synchronization parameter to the display, and synchronizing the audio and video signals, based on a user input to the UI.

In accordance with another aspect of the disclosure, a non-transitory computer-readable recording medium is provided, which stores instructions which, when executed by at least one processor, cause the at least one processor to executing an application, playing multimedia content through the application, obtaining information associated with playing the multimedia content, identifying a synchronization parameter for synchronizing an audio signal and a video signal of the multimedia content, based on the obtained information, outputting a UI generated based on the obtained information and the synchronization parameter to the display, and synchronizing the audio signal and the video signal based on a user input to the UI.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 7 illustrates AVSDB tables according to an embodiment;

DETAILED DESCRIPTION

Hereinafter, various embodiments of the disclosure will be described with reference to the attached drawings. However, these embodiments are not intended to limit the disclosure to specific embodiments but construed as including various modifications, equivalents, or alternatives of the embodiments of the disclosure.

Figure 1:
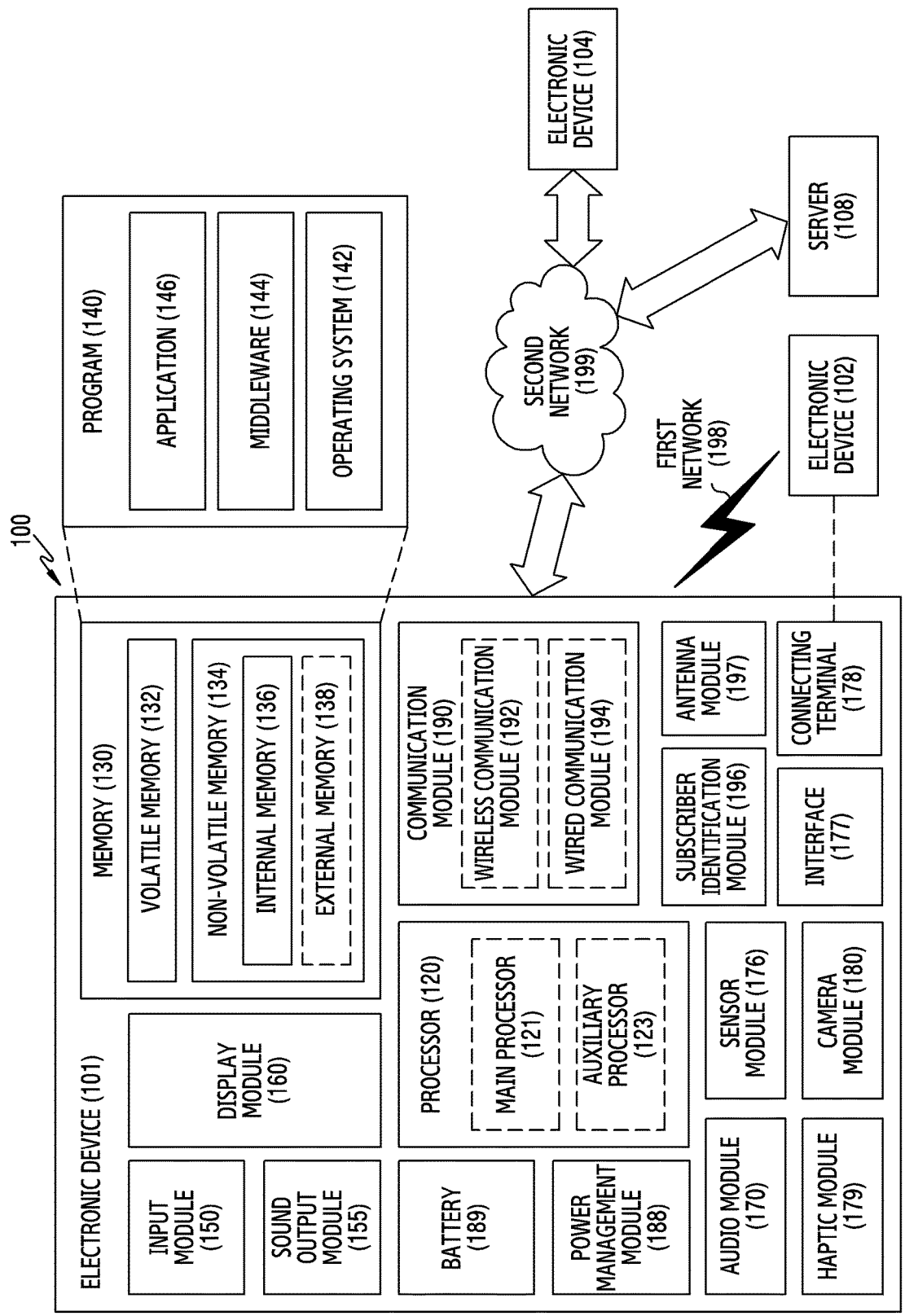
FIG. 1 illustrates an electronic device in a network environment according to an embodiment.

FIG. 1 illustrates an electronic device 101 in a network environment 100 according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna.

The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna.

According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
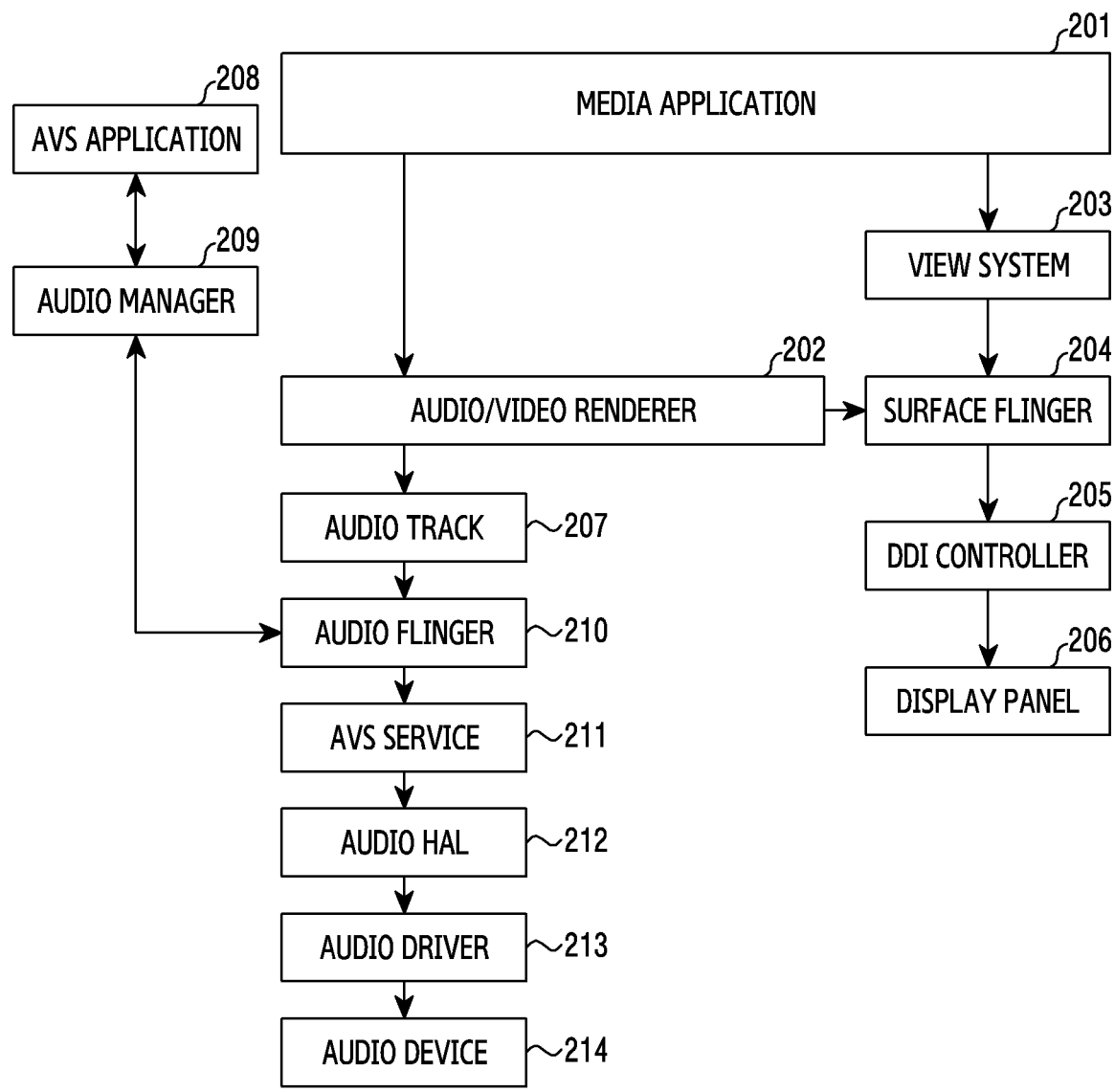
FIG. 2 illustrates of an audio-video sync (AVS) system of an electronic device according to an embodiment.

FIG. 2 illustrates an AVS system of an electronic device 101 according to an embodiment. For example, the AVS system of FIG. 2 may be construed as a multimedia content playback environment realized using hardware and/or software in the electronic device 101 of FIG. 1.

Referring to FIG. 2, in an embodiment, A processor 120 may execute a media application 201 for playing multimedia content in response to a user input. In an embodiment, the processor 120 may play multimedia content through the media application 201.

According to an embodiment, an audio/video renderer 202 may render an image of multimedia content to be output to a display of the electronic device 101, based on image data of the multimedia content. For example, the processor 120 may form a first surface as a kind of drawing space for image rendering. In one example, the audio/video renderer 202 may render an image of multimedia content on the first surface. The audio/video renderer 202 may transmit the first surface including the rendered image to a surface flinger 204.

According to an embodiment, a view system 203 may include a hierarchical structure (e.g., a tree structure or a list structure) including views. According to an embodiment, a view may refer to a configuration on a screen output through the display of the electronic device 101. In an embodiment, the processor 120 may form a second surface for drawing a user interface of the media application in response to execution of the media application 201. The processor 120 may form a view (e.g., text or an image) on the second surface according to the hierarchical view structure (e.g., a tree structure) of the view system 203.

According to an embodiment, a surface flinger 204 may synthesize at least one or more surfaces transmitted from the audio/video renderer 202 and/or the view system 203. For example, the surface flinger 204 may synthesize the first surface transmitted from the audio/video renderer 202 and the second surface transmitted from the view system 203. In an embodiment, the synthesized surfaces may be transmitted to a display driver integrated circuit (DDI) controller 205. In an embodiment, the display driver integrated circuit (DDI) controller 205 may control a display panel 206 to output the transmitted surfaces to the display panel 206.

According to an embodiment, the audio/video renderer 202 may render an audio of the multimedia content to be output to an audio device 214 (e.g., a speaker) of the electronic device 101, based on decoded audio data about the multimedia content. In an embodiment, a rendered audio signal may be transmitted to an audio flinger 210 via an audio track 207.

In an embodiment, the processor 120 may execute an audio-video synchronization (AVS) application 208 in response to a user input for playback of the multimedia content. In an embodiment, an audio manager 209 may provide a user interface for accessing an audio service to a user. Further, the audio manager 209 may transmit a user input through the AVS application 208 to the audio flinger 210. For example, when there is a user input for synchronizing audio and video signals of the multimedia content through the AVS application 208, the audio manager 209 may transmit the user input to the audio flinger 210.

In an embodiment, the audio flinger 210 may apply a sound effect to the audio signal transmitted from the audio track 207. In an embodiment, in the AVS service 211, the processor 120 may synchronize an audio signal and a video signal of the multimedia content. The audio signal may be transmitted to an audio hardware abstraction layer (HAL) 212 through the AVS service 211. The audio HAL 212 may control an audio driver 213 to output the audio signal to the audio device 214 (e.g., the speaker).

Figure 3:
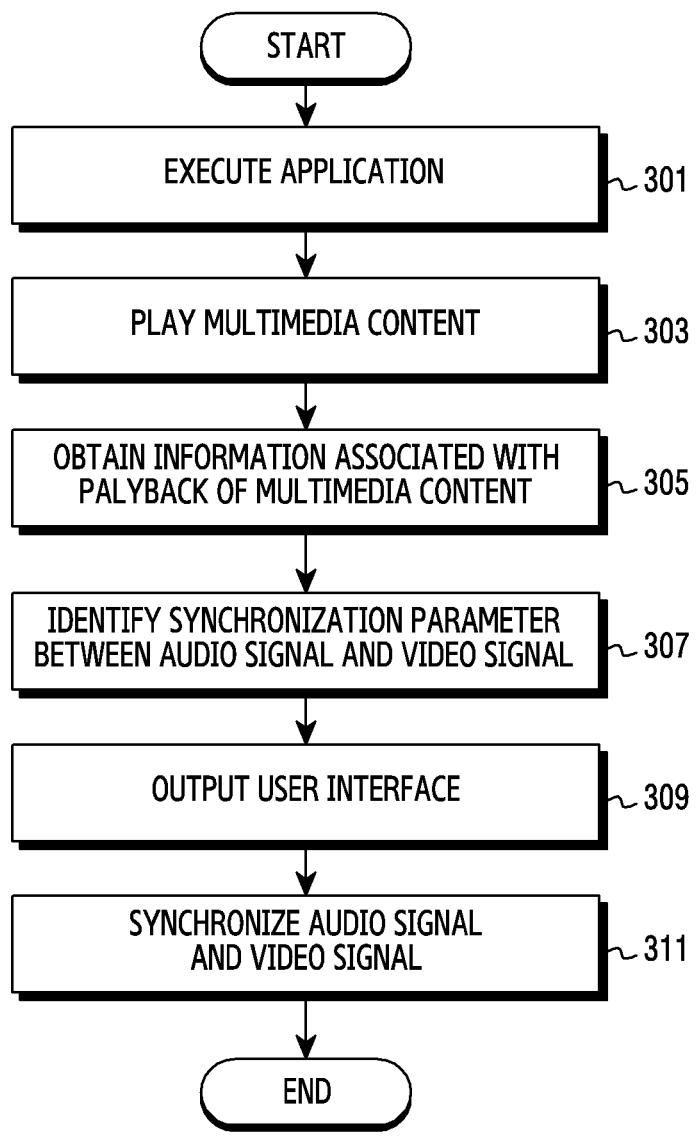
FIG. 3 is a flowchart illustrating a method for synchronizing an audio signal and a video signal of multimedia content in an AVS service according to an embodiment.

FIG. 3 is a flowchart illustrating a method for synchronizing an audio signal and a video signal of multimedia content in an AVS service according to an embodiment. FIG. 3 may correspond to operations of the AVS service 211 of FIG. 2.

Referring to FIG. 3, in step 301, an electronic device, e.g., a processor 120 according to an embodiment may execute a media application. For example, the processor 120 may identify a user input for an icon of the media application, and may execute the media application in response to this identification. In an embodiment, the processor 120 may display an execution screen of the media application on an area of a display.

In step 303, the processor 120 may play multimedia content. For example, the processor 120 may identify a user input for a play button in a user interface of the media application, and may play the multimedia content in response to the user input.

In step 305, the processor 120 may obtain information associated with playback of the multimedia content. For example, the processor 120 may obtain information associated with the playback of the multimedia content from a memory 130. In another example, the processor 120 may obtain information associated with the playback of the multimedia content from an external server.

In an embodiment, the information associated with the playback of the multimedia content may include information about an external electronic device, information about the media application, and/or information about the multimedia content. In an embodiment, the information about the external electronic device may include the type of the external electronic device (e.g., a car or an augmented reality (AR) glasses) and/or an address of the external electronic device with which the electronic device 101 establishes a connection for communication. The information about the media application may include information on the type of the media application. The information about the multimedia content may include the type of the played multimedia content and/or a synchronization value for synchronizing an audio signal and a video signal when the specified multimedia content is played.

Table 1 shows examples of a file extension, a container format, a video coding format, and an audio coding format according to the type (or name) of multimedia content.

TABLE 1

| Name | File extension | Container format | Video coding format | Audio coding format |
|------|---------------|------------------|---------------------|---------------------|
| WebM | .webm | Matroska | VP8, VP9, AV1 | Vorbis, Opus |
| VOB | .vob | VOB | H.262/MPEG-2 part 2 or MPEG-1 | Pulse code modulation, DTS, MPEG-1, Audio Layer II (MP2), or Dolby Digital (AC-3) |

TABLE 1-continued

| Name | File extension | Container format | Video coding format | Audio coding format |
|---|---|---|---|---|
| SVI | .svi | MPEG-4 using special header | — | — |
| ROQ | .roq | — | — | — |
| RMVB (RMVB) | .rmvb | RMVB | Real Video | Real Audio |
| QuickTime File Format | .mov, .qt | QuickTime | Multiple | AAC, MP3, etc. |
| Ogg Video | .ogv, .ogg | Ogg | Theora, Dirac | Vorbis, FLAC |
| MXF (MXF) | .mxf | MXF | — | — |
| MPEG-4 Part 14 (MP4) | .mp4, .m4p with DRM), .m4v | MPEG-4 Part 12 | H.264/MPEG-4 AVC, MPEG-4 MPEG-1 | Advanced Audio Coding, MP3, etc. |
| MPEG-2-Video | .mpg, .mpeg, .m2v | — | H.262/MPEG-2 Part 2 | AAC, MP3, MPEG-2 Part 3, etc. |
| MPEG-1 | .mpg, .mp2, .mpeg, .mpe, .mpv | MPEG-1 Part 1 | MPEG-1 Part 2 | MPEG-1 Audio Layer I, MPEG-1 Audio Layer I, MPEG-1 Audio Layer III (MP3) |
| MPEG Transport Stream | .MTS, .M2TS, .TS | AVCHD | AVCHD (MPEG-4/H.264) | Dolby AC-3 or uncompressed linear PCM |
| Matroska | .mkv | Matroska | All | All |
| M4V- (Video format for iPod and PlayStation Portable, developed by apple) | .m4v | MPEG-4 Part 12 | H.264/MPEG-4 AVC | AAC, Dolby Digital |
| GIFV (Video alternative to GIF) | .gifv | HTML | All | None |
| GIF | .gif | N/A | N/A | None |
| F4V | .flv | MPEG-4 Part 12 | H.264/MPEG-4 AVC | MP3, AAC |
| Dirac | .drc | — | Dirac | — |
| AVI | .avi | AVI | All | All |
| AMV (file format) | .amv | Modified version of AVI | Type of Motion JPEG | Type of IMA, ADPCM |
| Flash Video (FLV) | .flv | FLV | VP6, Sorenson Spark, Screen video, Screen video 2, H.264/MPEG-4 AVC | MP3, ADPCM, Nellymoser, Speex, AAC |
| Flash Video (FLV) | .flv, .f4v, .f4p, .f4a, .f4b | Audio, video, text, data | Adobe Flash Platform | SWF, F4V, ISO base media file format |
| Window Media Video | .wmv | ASF | Windows Media Video, Windows Media Video Screen, Windows Media Video Image | Windows Media Audio, Sipro ACELP.net |
| Multiple-image Network Graphics | .mng | N/A | N/A | None |
| Real Media (RM) | .rm | Real Media | Real Video | Real Audio |
| Raw video format | .yuv | Additional documentation required | N/A | N/A |
| Nullsoft Streaming Video | .nsv | NSV | — | — |

TABLE 1-continued

| Name | File extension | Container format | Video coding format | Audio coding format |
|---|---|---|---|---|
| Advance Systems Format (ASF) | .asf | ASF | All | All |
| 3GPP2 | .3g2 | MPEG-4 Part 12 | MPEG-4 Part 2, H.263, H.264/MPEG-4 AVC | AMR-NB, Adaptive Multi-Rate Wideband, AMR-WB+, AAC-LC, HE-AAC v1, or Enhanced aacPlus (HE-AAC v2), EVRC, SMV, or VMR-WB |
| 3 GPP | .3gp | MPEG-4 Part 12 | MPEG-4 Part 2, H.263, H.264/MPEG-4 AVC | AMR-NB, Adaptive Multi-Rate Wideband, AMR-WB+, AAC-LC, HE-AAC v1, or Enhanced aacPlus (HE-AAC v2) |

However, the information associated with the playback of the multimedia content is not limited to the information about the external electronic device, the information about the media application, and the information about the multimedia content illustrated above, but may include various types of information available to synchronize the audio signal and the video signal of the multimedia content.

In step 307, the processor 120 may identify a synchronization parameter between the audio signal and the video signal of the multimedia content, based on the information associated with the playback of the multimedia content obtained in step 305. In an embodiment, the synchronization parameter may include a synchronization range (e.g., a synchronization minimum value and a synchronization maximum value), a predetermined recommended synchronization value, and/or a synchronization gap.

In step 309, the processor 120 may output a user interface generated based on the synchronization parameter identified in step 307, on a display of the electronic device 101. In an embodiment, the user interface may include a control bar, and the control bar may include the synchronization range, the predetermined recommended synchronization value, and/or the synchronization gap.

According to another embodiment, the user interface may have various forms. For example, when the user interface has a circular shape, the synchronization range and/or the synchronization gap may be displayed along the edge of the circular shape, and the predetermined recommended synchronization value may be displayed in the center of the circular shape.

In step 311, the processor 120 may synchronize the audio signal and the video signal of the multimedia content in response to a user input to the user interface. For example, the user interface output to the display of the electronic device 101 may include a control bar. In one example, the user may move a synchronization control point positioned at a first point of the control bar to a second point. Accordingly, the processor 120 may change the video signal of the multimedia content from a first time point corresponding to the first point to a second time point corresponding to the second point. The processor 120 may synchronize the audio signal and the video signal of the multimedia content, based on the second time point.

Figure 4:
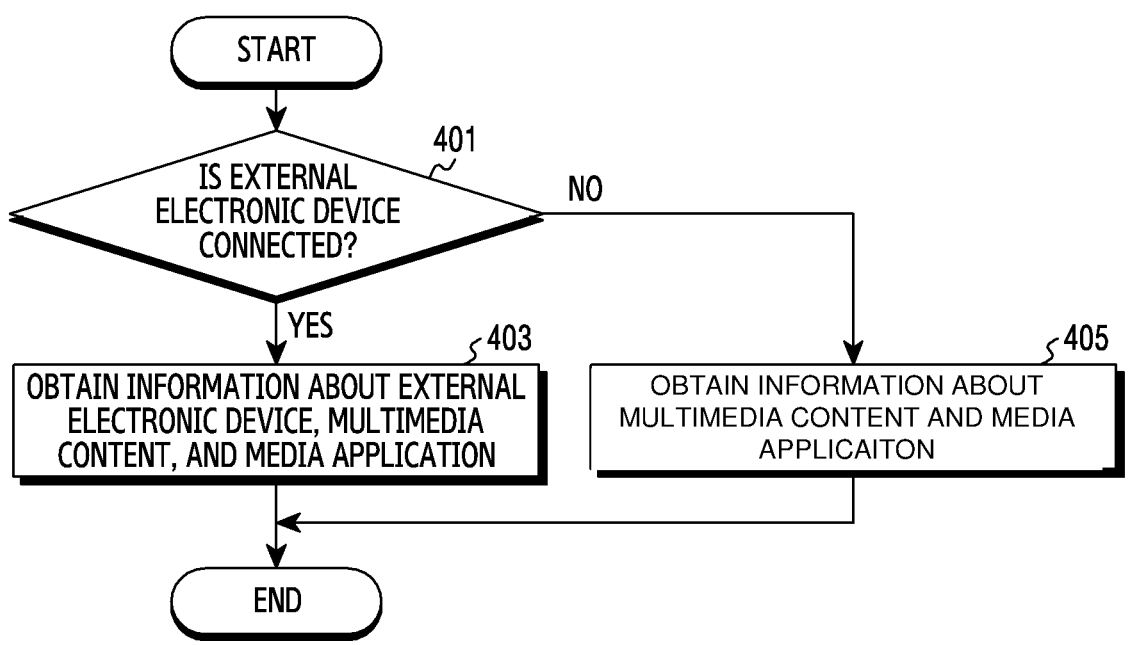
FIG. 4 is a flowchart illustrating a method for obtaining information associated with multimedia content according to an embodiment.

FIG. 4 is a flowchart illustrating a method for obtaining information associated with multimedia content according to an embodiment. For example, the method of FIG. 4 may correspond to step 303 of FIG. 3.

Referring to FIG. 4, in step 401, a processor 120 may determine whether the electronic device 101 has been connected to an external electronic device. For example, the processor 120 may determine whether the electronic device 101 establishes a wireless communication channel with the external electronic device through a communication module 190 of the electronic device 101.

According to an embodiment, when it is determined that the electronic device 101 has been connected to the external electronic device in step 401, the processor 120 may obtain information about the external electronic device, multimedia content, and/or a media application in step 403. In an embodiment, the processor 120 may obtain the foregoing pieces of information by various method. For example, the processor 120 may obtain the information about the external electronic device, the multimedia content, and/or the media application from a memory 130 of the electronic device 101 or from an external server. In another example, when it is difficult to connect to the external server, the processor 120 may selectively obtain the information from the memory of the electronic device 101, and when it is easy to connect to the external server, the processor 120 may obtain the information from the external server.

According to an embodiment, when it is determined that the electronic device 101 has not been connected to the external electronic device in step 401, the processor 120 may obtain the information about the multimedia content and/or the media application from the memory 130 of the electronic device 101 or may be obtained from the external server in step 405.

Figure 5:
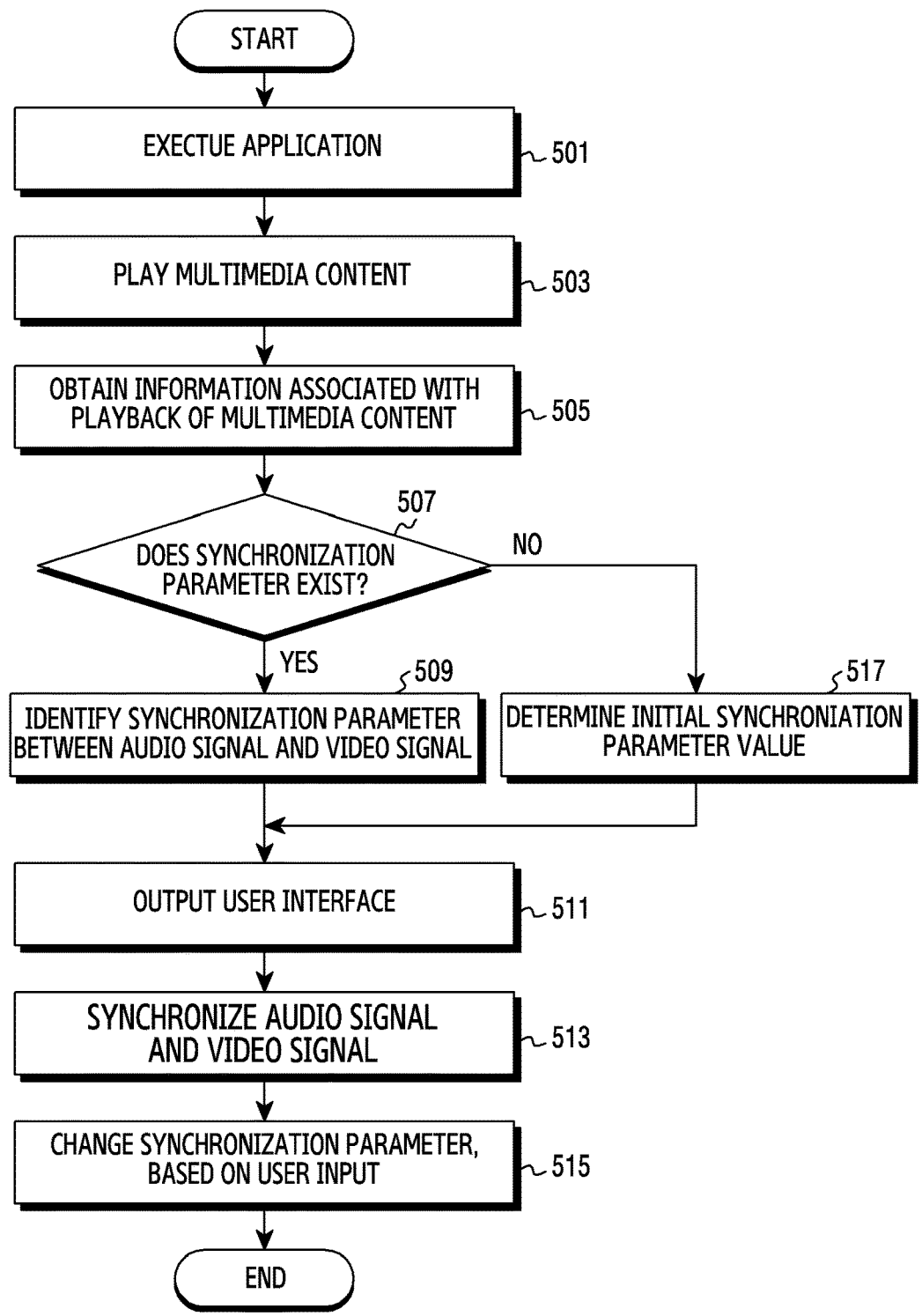
FIG. 5 is a flowchart illustrating a method for determining an initial value of a synchronization parameter and changing the synchronization parameter, based on a user input, according to an embodiment.

FIG. 5 is a flowchart illustrating a method for determining an initial value of a synchronization parameter and changing the synchronization parameter, based on a user input, according to an embodiment.

Referring to FIG. 5, steps 501, 503, 505, 509, 511, and 513 may correspond to steps 301, 303, 305, 307, 309, and 311 of FIG. 3, respectively, and as such, a repetitive description of these steps will be omitted below. Instead, steps 507, 517, and 515 will be mainly described below.

In step 507, the processor 120 may determine whether there is a synchronization parameter (e.g., a synchronization range, a recommended synchronization value, and a synchronization gap) corresponding to information associated with playback of multimedia content, based on information obtained in step 505.

In an embodiment, when it is determined that there is a synchronization parameter corresponding to the information in step 507, the processor 120 may perform operation 509.

However, when it is determined that there is no synchronization parameter corresponding to the information in step 507, the processor 120 may determine an initial synchronization parameter value in step 517. In an embodiment, the processor 120 may determine the initial synchronization parameter value by performing a simulation or by receiving the initial synchronization parameter value from an external server.

In step 515, the processor 120 may change the synchronization parameter, based on a user input. For example, the processor 120 may output a user interface displaying the synchronization parameter (e.g., the synchronization range, the recommended synchronization value, and the synchronization gap) on a display of the electronic device 101. In one example, in response to the user input, the processor 120 may synchronize the audio and video signals of the multimedia content, based on a synchronization value different from the recommended synchronization value displayed on the user interface. Accordingly, the processor 120 may change the recommended synchronization value, based on the synchronization value according to the user input that is different from the recommended synchronization value. The processor 120 may provide the recommended synchronization value changed according to the user input when a different user plays substantially the same multimedia content. For example, the processor 120 may transmit the changed recommended synchronization value to the external server.

The external server may store the obtained recommended synchronization value, and may transmit the stored recommended synchronization value to an electronic device of the different user when the different user plays substantially the same multimedia content. For example, a case where the external server transmits the recommended synchronization value may refer to a case where the different user uses an external electronic device substantially the same as the electronic device 101 of the user and a media application substantially the same as the electronic device 101. However, the case may refer to a case in which a similar external device and a similar media application are used, without being limited to the foregoing case. In another example, the processor 120 may provide the changed recommended synchronization value to an electronic device of a different user that executes substantially the same multimedia content through an electronic device-to-device method without going through the external server.

Figure 6:
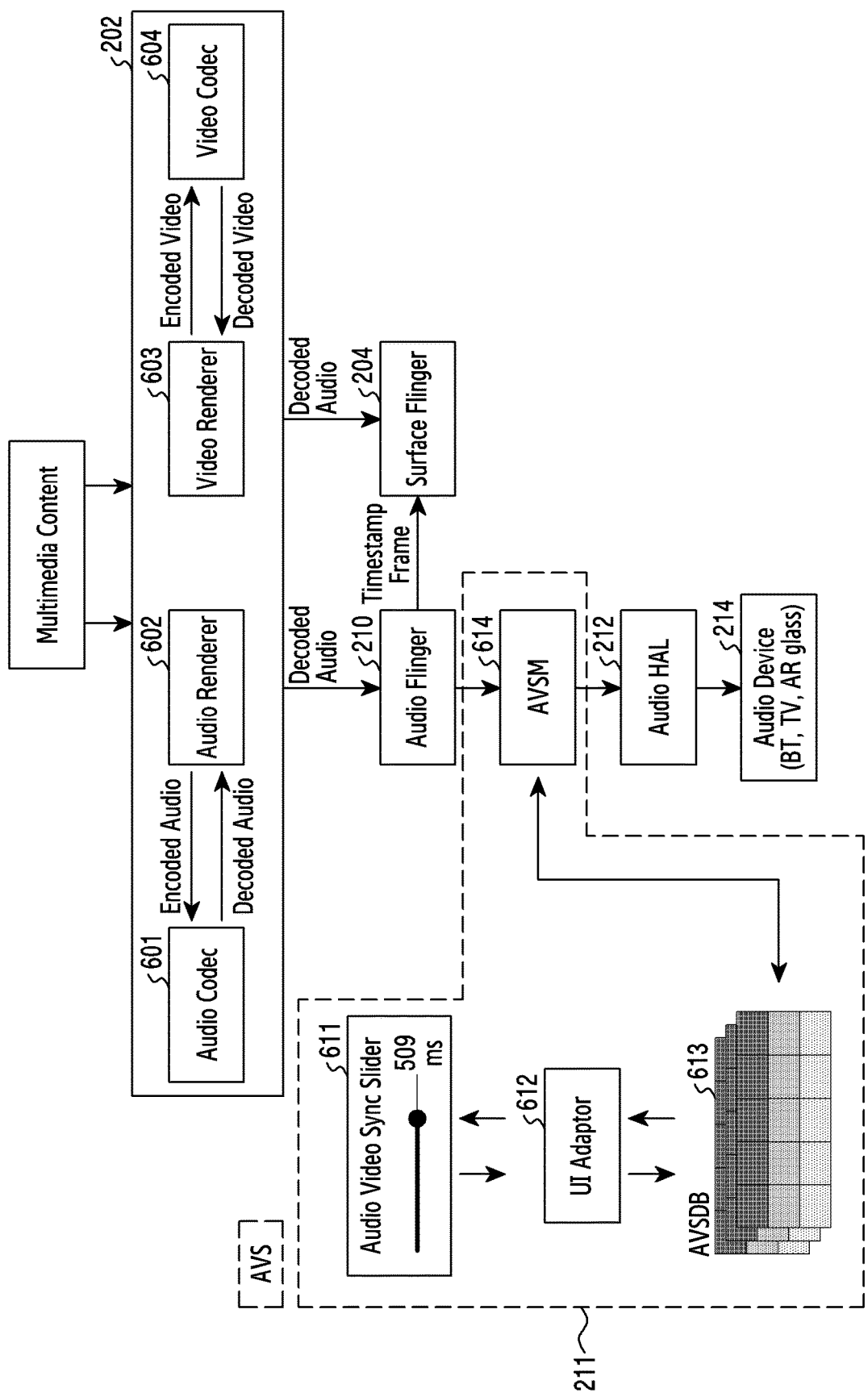
FIG. 6 illustrates an AVS service using an audio-video synchronization database (AVSDB) according to an embodiment.

FIG. 6 illustrates an AVS service using an AVSDB according to an embodiment.

Referring to FIG. 6, a memory 130 may include an audio-video synchronization database (AVSDB) 613 for an AVS service 211. In an embodiment, a processor 120 may display a synchronization parameter on a user interface 611, based on information associated with playback of multimedia content stored in the AVSDB 613. For example, the processor 120 may display a synchronization range and a recommended synchronization value (e.g., 509 ms) on the user interface 611, based on the information associated with the playback of the multimedia content.

According to an embodiment, in response to a user input to the user interface 611, the processor 120 may store information about a synchronization value according to the user input in the AVSDB 613 through a UI adapter 612. For example, a user may designate a synchronization value (e.g., 500 ms) different from the recommended synchronization value (e.g., 509 ms) through the user input to the user interface 611. In this case, the processor 120 may store information about the synchronization value (e.g., a special content table) according to the user input in the AVSDB 613 through the UI adapter 612.

According to an embodiment, an audio/video renderer 202 may include an audio codec 601, an audio renderer 602, a video renderer 603, and/or a video codec 604. In an embodiment, the audio renderer 602 may calculate an offset from encoded audio data included in the multimedia content to calculate a part to be subsequently decoded, and may transmit the part to be subsequently decoded to the audio codec 601. The audio codec 601 may decode data received from the audio renderer 602 and may transmit the data to the audio renderer 602. In an embodiment, the video codec 604 may decode a video signal of the multimedia content encoded by the video renderer 603. The video renderer 603 may calculate an offset from encoded video data included in the multimedia content to calculate a part to be subsequently decoded, may transmit the part to be subsequently decoded to the video codec 604, and may request decoding of the part. In an embodiment, an audio signal decoded by the audio renderer 602 may be transmitted to an audio flinger 210, and the video signal decoded by the video renderer 603 may be transmitted to a surface flinger 204. In an embodiment, the audio flinger 210 may transmit a timestamp to the surface flinger 204, based on the obtained audio signal.

According to an embodiment, an audio-video synchronization manager (AVSM) 614 may synchronize the audio signal obtained from the audio flinger 210 with the video signal of the multimedia content, based on a user input. In an embodiment, the AVSM 614 may transmit the synchronized audio signal to an audio HAL 212. The audio HAL 212 may output the synchronized audio signal to an audio device 214 (e.g., a speaker) through an audio driver 213.

FIG. 7 illustrates AVSDB tables according to an embodiment.

Referring to FIG. 7, according to an embodiment, the AVSDB 613 may include a play information table (a), an audio device table (b), a player table (c), a special content table (d), and/or an auditory characteristic table (e).

According to an embodiment, the play information table (a) may store an identification (ID) (e.g., a device ID) of an external electronic device used to play multimedia content. The play information table may store an ID (e.g., a player ID) of a media application executed when playing the multimedia content. A recommended synchronization value for synchronization of an audio signal and a video signal may be stored in the play information table. The recommended synchronization value may be obtained through a simulation for synchronizing an audio signal and a video signal, or may be a value determined by obtaining a synchronization value most selected by users corresponding to the multimedia content from an external server. In the play information table, a unit (e.g., msec or frame) of a synchronization parameter displayed on a user interface may be displayed. In an embodiment, when synchronizing audio signal and a video signal of multimedia content played in an electronic device 101 without connecting to the external electronic device, the play information table may store an ID of the electronic device 101 instead of the ID of the external electronic device ID.

According to an embodiment, various recommended synchronization values may correspond to the ID of the external electronic device and the ID of the media application. For example, even though multimedia content is executed using substantially the same external electronic device and substantially the same media application, a recommended synchronization value may vary according to a configuration of the external electronic device by a user. In an example, when the user configures the external electronic device (e.g., AR glasses) to a low-latency mode and executes multimedia content, a recommended synchronization value (e.g., 503 ms) may be lower than a recommended synchronization value (e.g., 600 ms) in a case other than the low-latency mode. Even though multimedia content is executed using substantially the same external electronic device and substantially the same media application, a recommended synchronization value may vary according to a configuration of the media application by a user. When the user configures the sound quality of the multimedia content to a relatively low value (e.g., 128 kbps) and to a relatively high value (e.g., 320 kbps) through the configuration of the media application, different recommended synchronization values may be employed.

According to an embodiment, the audio device table (b) may store the type of an external electronic device (e.g., a Bluetooth headset, a car, or AR glasses) with which the electronic device 101 establishes a connection for communication.

The audio device table may store information for identifying the external electronic device. For example, the audio device table may store an address of the external electronic device. The audio device table may store a recommended synchronization value, and the recommended synchronization value stored in the audio device table may correspond to the recommended synchronization value stored in the play information table (a).

The audio device table may store a maximum audio latency that refers to a value at which the external electronic device can maximally synchronize an audio signal and a video signal. For example, the electronic device 101 may determine the maximum audio latency, based on information about the external electronic device, and may store the determined maximum audio latency in the audio device table. In one example, the audio latency corresponding to the external electronic device may vary according to the number of external electronic devices connected to the electronic device 101. For example, when the electronic device 101 is connected to three external electronic devices, the maximum audio latency value of the external electronic devices (e.g., a car) may be 192 ms. In an example, when the number of external electronic devices to which the electronic device 101 is connected varies, the audio latency value (e.g., 192 ms) may vary.

According to an embodiment, the player table (c) may store unique information about a media application. The unique information may be formed in various manners. For example, the unique information may be formed by combining a package name and a package version. The player table may store a minimum value and/or a maximum value for synchronization allowable by the media application. The minimum value and/or the maximum value may be unique values of the media application in which multimedia content is played, or may be values changed based on a user input.

According to an embodiment, the special content table (d) may store unique information (e.g., a uniform resource locator: (URL)) for identifying multimedia content. The special content table may store an ID (device ID) of an external electronic device and an ID (player ID) of a media application may be stored in the special content table. The ID (device ID) of the external electronic device stored in the special content table may correspond to the ID (device ID) of the external electronic device in the play information table (a). Further, the ID of the media application stored in the special content table may correspond to the ID of the media application in the play information table (a). A synchronization value difference (synchronization value delta) may be stored in the special content table.

According to an embodiment, the auditory characteristic table (e) may store an auditory sensitivity level. The auditory sensitivity level may be obtained through an auditory characteristic measurement application.

Figure 8:
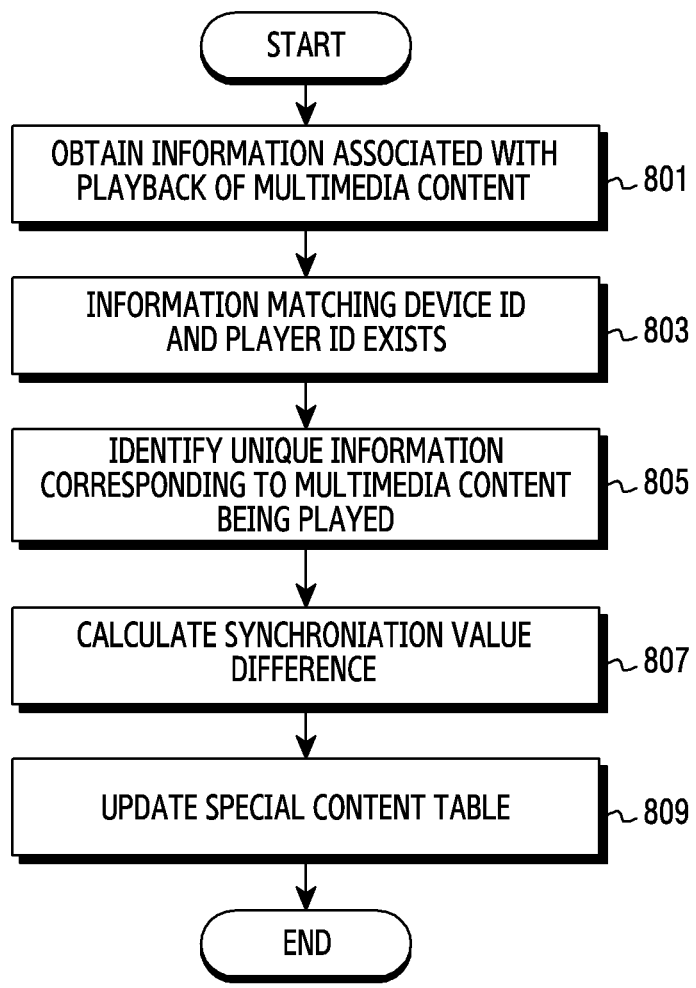
FIG. 8 is a flowchart illustrating a method for updating a special content table according to an embodiment.

FIG. 8 is a flowchart illustrating a method for updating a special content table according to an embodiment.

Referring to FIG. 8, in step 801, a processor 120 may obtain information associated with playback of multimedia content previously stored in a memory 130 and/or an external server. In an embodiment, the previously stored information associated with the playback of the multimedia content may include information about an external electronic device (e.g., an ID list (device ID) of an external electronic device), information about a media application (e.g., an ID list (player ID) of a media application), and/or information about multimedia content (e.g., a unique information list (e.g., a uniform resource locator: URL) for identifying multimedia content).

In step 803, the processor 120 may identify an ID (device ID) of an external electronic device connected to an electronic device 101 and an ID (player ID) of a media application. The processor 120 may determine whether there is information matching the ID of the external electronic device and the ID of the media application in the ID list of the external electronic device and the ID list of the media application previously stored in an AVSDB.

According to an embodiment, when it is determined that there is the matching information, the processor 120 may identify unique information (e.g., a URL) corresponding to the multimedia content being played in step 805. The processor 120 may determine whether there is information matching the unique information in the unique information list previously stored in the AVSDB.

According to an embodiment, when it is determined that there is no information matching the unique information in the unique information list, the processor 120 may calculate a difference between a recommended synchronization value and a synchronization value according to a user input in step 807. For example, when the recommended synchronization value through a simulation is 200 ms and the synchronization value according to the user input is 250, the difference between the synchronization values may be 250−200=50 ms.

In step 809, the processor 120 may update the calculated difference between the synchronization values in a special content table of the AVSDB.

In an embodiment, as the special content table is updated, when the multimedia content is subsequently played in substantially the same external electronic device and substantially the same media application, the processor 120 may display the synchronization value according to the user input, instead of the recommended synchronization value, in a user interface.

Figure 9:
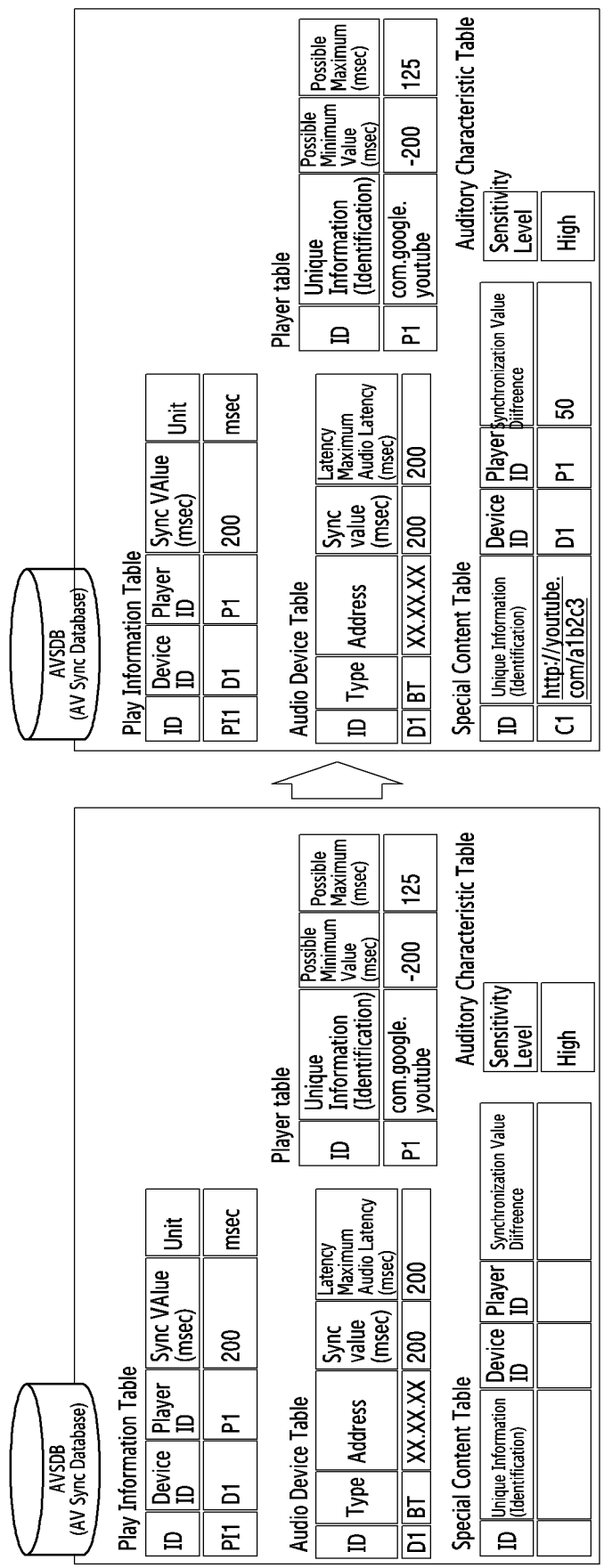
FIG. 9 illustrates updating a special content table according to an embodiment.

FIG. 9 illustrates updating a special content table according to an embodiment.

Referring to FIG. 9, the processor 120 according to an embodiment may identify an ID list (e.g., D1) of an external electronic device and an ID list (e.g., P1) of a media application that are previously stored in an AVSDB before an update. The processor 120 may determine whether there is information matching an ID of an external electronic device executing multimedia content and an ID of a media application executing the multimedia content in the identified ID list (e.g., D1) of the external electronic device and the identified ID list (e.g., P1) of the media application. In an embodiment, when it is determined that there is the matching information, the processor 120 may determine whether there is information matching unique information about the multimedia content being executed in a unique information list previously stored in a special content table. When there is no information matching the unique information about the multimedia content being executed in the unique information list of the AVSDB, the processor 120 may update the special content table. For example, the processor 120 may input a URL of the multimedia content being executed to the unique information of the special content. In addition, the processor 120 may input the ID list (e.g., D1) of the external electronic device executing the multimedia content and the ID list (e.g., P1) of the media application executing the multimedia content. When a synchronization value by a user input is 250 ms, the processor 120 may compare the synchronization value with a recommended synchronization value (e.g., 200 ms) and may input a synchronization value difference (synchronization value delta) of 50 ms.

Figure 10:
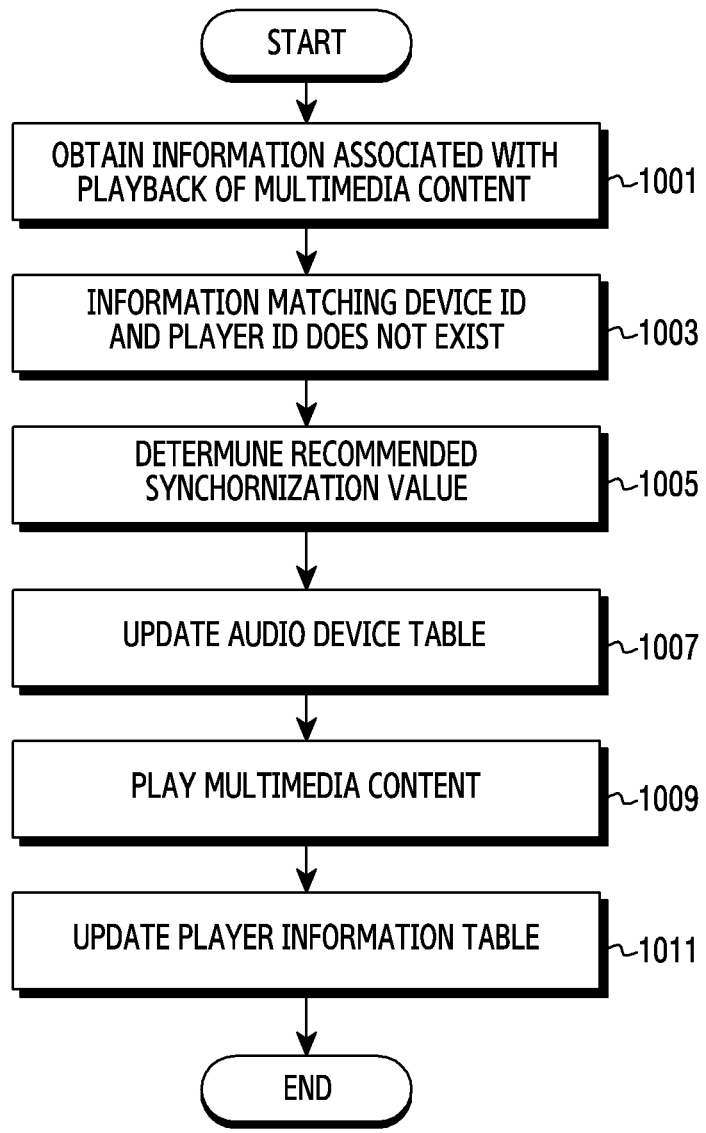
FIG. 10 is a flowchart illustrating a method for updating an audio device table and a player information table according to an embodiment.

FIG. 10 is a flowchart illustrating a method for updating an audio device table and a player information table according to an embodiment.

Referring to FIG. 10, in step 1001, a processor 120 may obtain information associated with playback of multimedia content previously stored in a memory 130 and/or an external server. In an embodiment, the previously stored information associated with the playback of the multimedia content may include information about an external electronic device (e.g., an ID (device ID) of an external electronic device) and information about a media application (e.g., an ID (player ID) of a media application).

According to an embodiment, the processor 120 may identify the ID (device ID) of the external electronic device executing the multimedia content and the ID (player ID) of the media application executing the multimedia content.

In step 1003, the processor 120 may determine whether there is information matching the ID of the external electronic device and the ID of the media application in an ID list of an external electronic device and an ID list of a media application previously stored in an AVSDB. In an embodiment, when the multimedia content is initially played in the external electronic device, the processor 120 may determine that there is no matching information, based on the above determination.

In step 1005, when it is determined that there is no matching information, the processor 120 may determine a recommended synchronization value. In an embodiment, the recommended synchronization value may be a value determined through a simulation or a value determined by obtaining a synchronization value most selected by users for the multimedia content from an external server.

In step 1007, the processor 120 may update an audio device table. For example, the type of the external electronic device (e.g., a Bluetooth headset, a car, or AR glasses), unique information (e.g., an address) about the external electronic device, the recommended synchronization value, and/or the maximum audio latency of the external electronic device may be updated.

In step 1009, the processor 120 may play the multimedia content through the media application.

In step 1011, the processor 120 may identify the media application that plays the multimedia content and may update a player information table, based on information about the media application. For example, unique information (e.g., a package name or a package version) about the media application and a minimum and/or maximum value for synchronization allowed by the media application may be stored.

Although it is shown that the processor 120 performs step 1011 of updating the player information table after step 1009 of playing the multimedia content in an embodiment, the processor 120 may play the multimedia content and may update the player information table at substantially the same time. The processor 120 may update the player information table even before playing the multimedia content.

Figure 11:
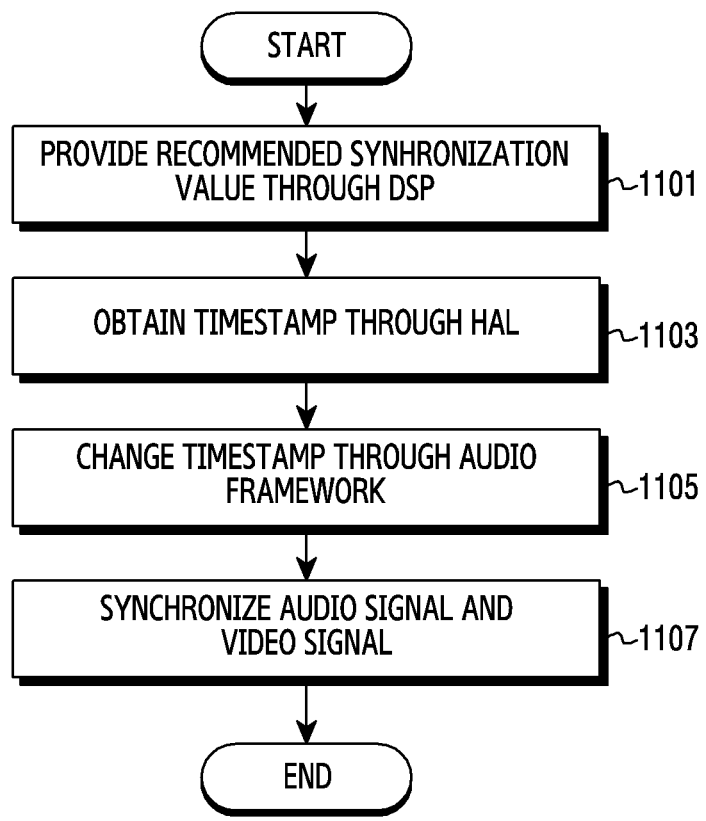
FIG. 11 is a flowchart illustrating a method for determining a recommended synchronization value and synchronizing an audio signal and a video signal of multimedia content according to the recommended synchronization value according to an embodiment.

FIG. 11 is a flowchart illustrating a method for determining a recommended synchronization value and synchronizing audio and video signals according to the recommended synchronization value according to an embodiment.

Referring to FIG. 11, in step 1101, a processor 120 according to an embodiment may provide a recommended synchronization value for synchronization of an audio signal and a video signal of multimedia content through a digital signal process (DSP).

In step 1103, the processor obtains a timestamp of the audio signal through an audio HAL. According to an embodiment, a timestamp may refer to a playback time of a signal.

In an embodiment, the processor 120 may synchronize the audio signal and the video signal, based on the recommended synchronization value provided from the DSP.

In step 1105, the processor 120 may change the timestamp of the audio signal according to a corrected value through an audio framework. In an embodiment, the corrected value may refer to a value for changing the timestamp of the audio signal obtained through the HAL 212 in order to synchronize the audio signal and the video signal, based on the recommended synchronization value.

In step 1107, the processor 120 may synchronize the audio signal and the video signal of the multimedia content.

Figure 12:
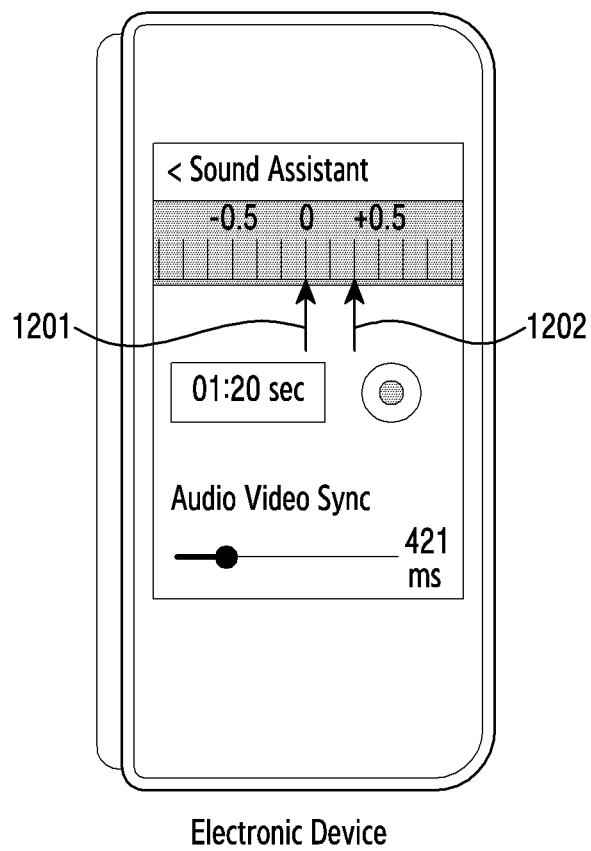
FIG. 12 illustrates a simulator for determining a recommended synchronization value according to an embodiment.

FIG. 12 illustrates a simulator for determining a recommended synchronization value according to an embodiment.

Referring to FIG. 12, a processor 120 according to an embodiment may determine a recommended synchronization value for an audio signal and a video signal of multimedia content through a simulation. For example, the processor 120 may match a second arrow 1202 corresponding to the video signal with a first arrow 1201 corresponding to the audio signal. In one example, when the first arrow 1201 and the second arrow 1202 match, a sound (e.g., a beep sound) through a sound output module and/or vibrations through a haptic module may be output. According to an embodiment, the processor 120 may calculate a time required to match the first arrow 1201 and the second arrow, thereby determining the recommended synchronization value.

Figure 13:
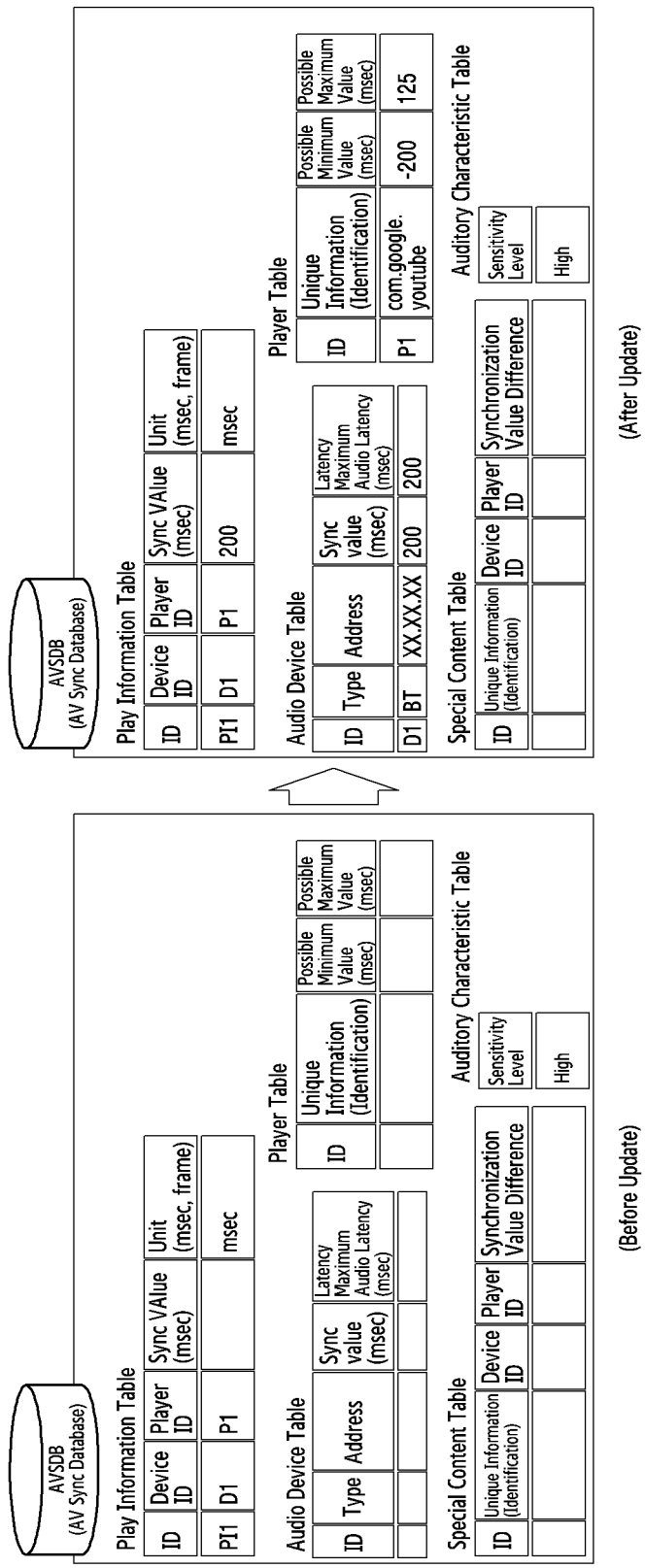
FIG. 13 illustrates updating an audio device table and a player table after determining a recommended synchronization value according to an embodiment.

FIG. 13 illustrates updating an audio device table and a player table after determining a recommended synchronization value according to an embodiment.

Referring to FIG. 13, a processor 120 according to an embodiment may determine a recommended synchronization value (e.g., 200 ms) through simulation. The processor 120 may input a simulation value (e.g., 200 ms) into recommended synchronization values of a play information table and an audio device table. In an embodiment, the processor 120 may identify an external electronic device, and may input an external electronic device ID list (e.g., D1), the type of the external electronic device (e.g., a Bluetooth device), an address thereof (e.g. a MAC address of the Bluetooth device), and/or a maximum audio latency thereof (e.g. 200 ms) in the audio device table, based on identification of the external electronic device. In an embodiment, the processor 120 may identify a media application that plays multimedia content. The processor 120 may input unique information (e.g., com.google.youtube) about the media application and a minimum value (e.g., −200 ms) and/or a maximum value (e.g., 125 ms) allowable by the media application to a player table.

Figure 14:
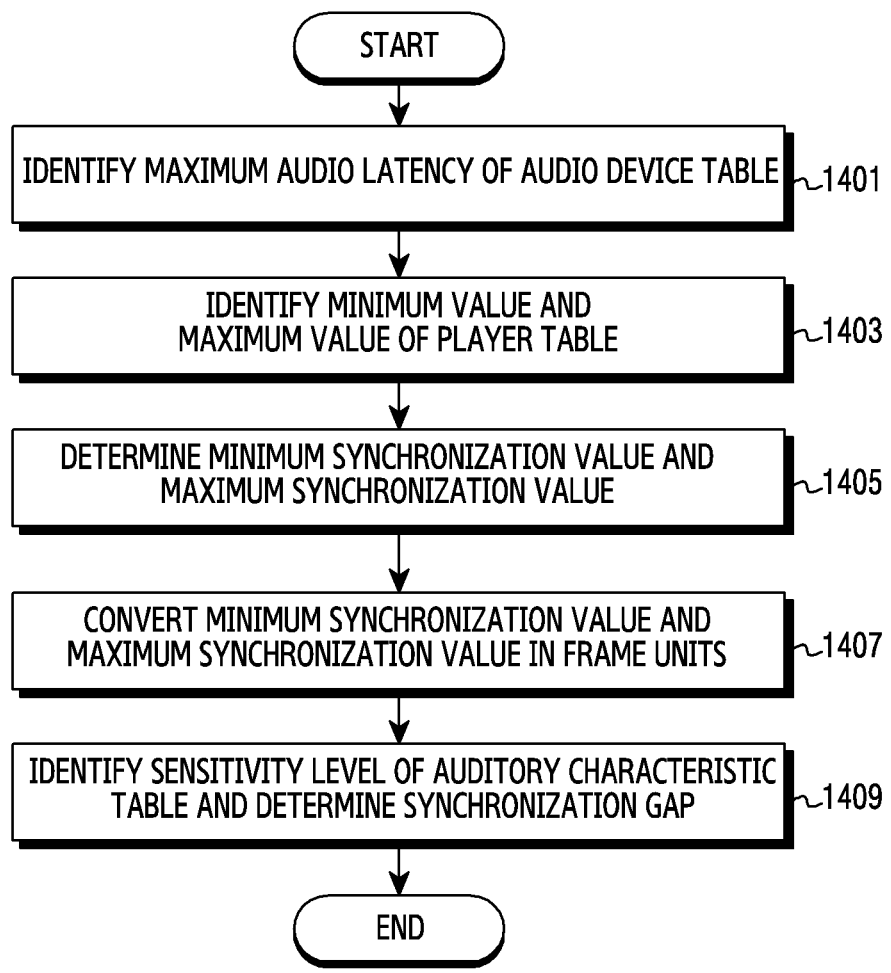
FIG. 14 is a flowchart illustrating a method for determining a synchronization parameter according to an embodiment.

FIG. 14 is a flowchart illustrating a method for determining a synchronization parameter according to an embodiment.

Referring to FIG. 14, in step 1401, a processor 120 may identify a maximum audio latency from an audio device table corresponding to played multimedia content. For example, the processor 120 may obtain the audio device table of an AVSDB from a memory 130. In one example, the processor 120 may identify a maximum audio latency value of the obtained audio device table.

In step 1403, the processor 120 may identify a minimum value and a maximum value of a player table corresponding to the played multimedia content. For example, the processor 120 may obtain the player table of the AVSDB from the memory 130. The processor 120 may identify the minimum value and the maximum value from the obtained player table.

In step 1405, the processor 120 may determine a minimum synchronization value by comparing the minimum value of the player table with the maximum audio latency of the audio device table. For example, the processor 120 may compare the maximum audio latency of the audio device table identified in step 1401 with the minimum value of the player table identified in step 1403 and may determine a smaller value as the minimum synchronization value. processor 120 may determine the maximum value of the player table as a maximum synchronization value in step 1405. In an embodiment, the minimum synchronization value and the maximum synchronization value determined by the processor 120 may correspond to synchronization parameters displayed on a user interface.

In step 1407, the processor 120 may convert the minimum synchronization value and the maximum synchronization value in frame units.

In step 1409, the processor 120 may identify a sensitivity level of an auditory characteristic table corresponding to the played multimedia content and may determine a synchronization gap, based on the sensitivity level. For example, the sensitivity level of the auditory characteristic table may be divided into a high level and a low level.
The processor 120 may determine the synchronization gap to be a smaller value in a high sensitivity level than in a low sensitivity level, or the processor 120 may determine the synchronization gap to be a greater value in a low sensitivity level than in a high sensitivity level. Although it is shown in one example that the sensitivity level of the auditory characteristic table may have a high level and a low level, this example is only for illustration, and the sensitivity level of the auditory characteristic table may be expressed in various manners. For example, the sensitivity level of the auditory characteristic table may be expressed as high, medium, and low, or as a number ranging from 1 to 100.

Figure 15:
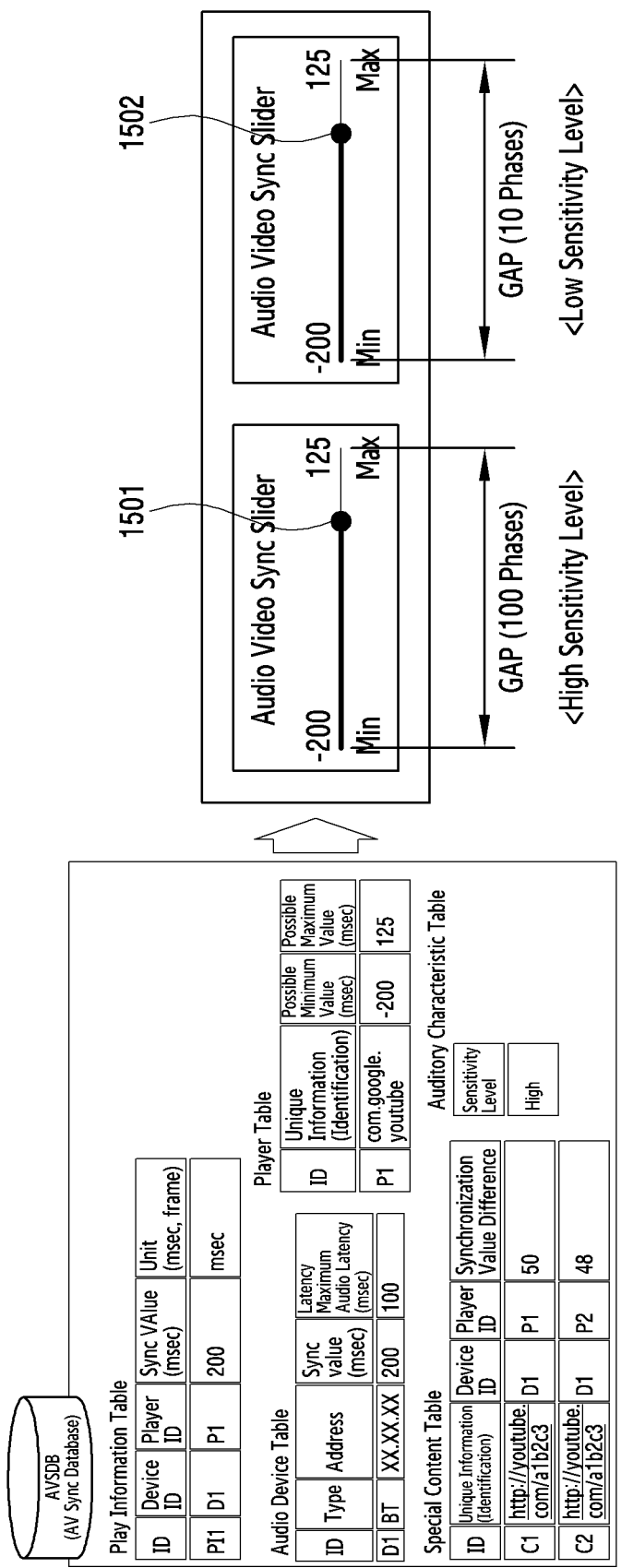
FIG. 15 illustrates displaying a synchronization parameter on a UI using an AVSDB according to an embodiment.

FIG. 15 illustrates displaying a synchronization parameter on a user interface using an AVSDB according to an embodiment.

Referring to FIG. 15, a processor 120 according to an embodiment may identify a maximum audio latency (e.g., 100 ms) from an audio device table. The processor 120 may identify a minimum value (e.g., −200 ms) and a maximum value (e.g., 125 ms) of a player table. The processor 120 may determine a minimum synchronization value (e.g., −200 ms) by comparing the minimum value (e.g., −200 ms) of the player table with the maximum audio latency (e.g., 100 ms). In an embodiment, the processor 120 comparing the minimum value of the player table and the maximum audio latency may mean comparing the absolute values thereof. The processor 120 may identify a sensitivity level (e.g., high) of an auditory characteristic table and may determine a synchronization gap, based on the sensitivity level. For example, when the sensitivity level is high, a synchronization gap may have a smaller value than when the sensitivity level is low, and accordingly a user may adjust a synchronization control point 1501 in 100 phases. In another example, when the sensitivity level is low, the synchronization gap may have a great value, and thus, for example, the user may adjust a synchronization control point 1502 in 10 phases.

Figure 16:
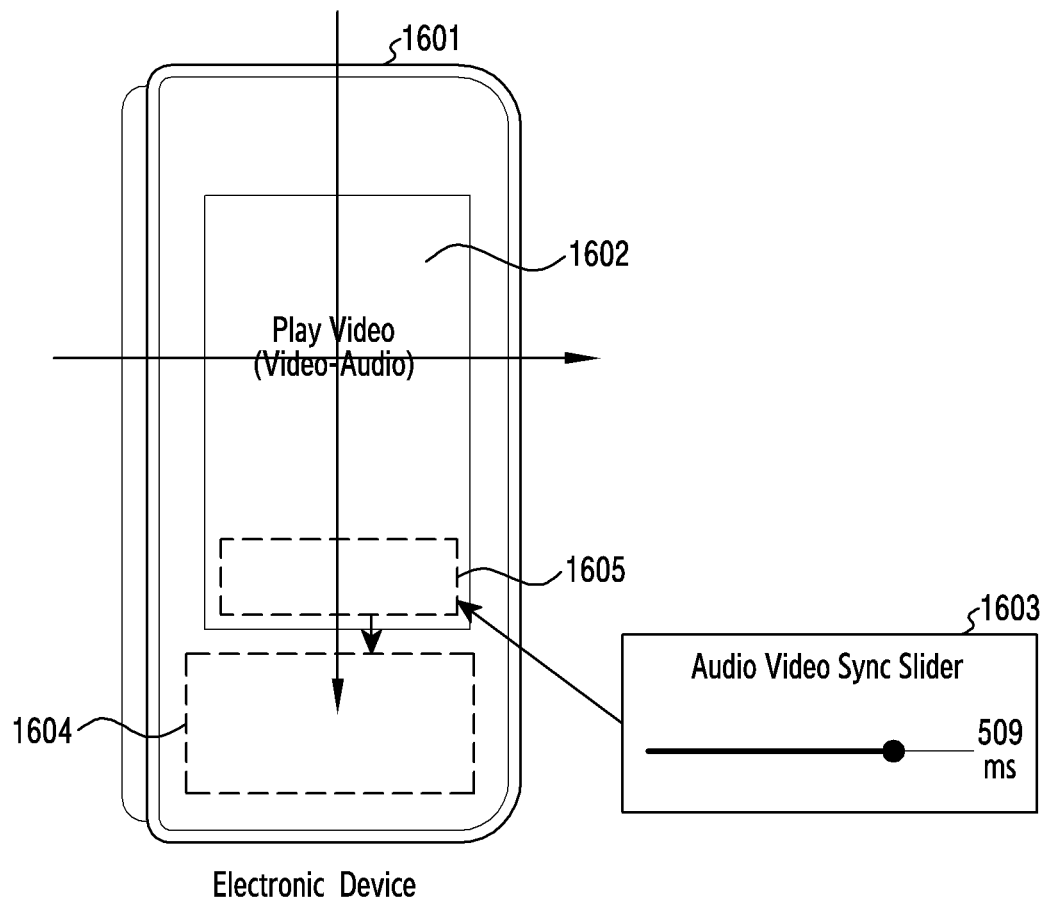
FIG. 16 illustrates a method for outputting a UI on a display according to an embodiment.

FIG. 16 illustrates a method for outputting a user interface on a display according to an embodiment.

Referring to FIG. 16, a processor 120 according to an embodiment may output multimedia content to a first area 1602 of a display area 1601 of an electronic device 101. In an embodiment, as the multimedia content is played, the processor 120 may output a user interface 1603 for synchronizing an audio signal and a video signal of the multimedia content to one area of the display areas 1601. In an embodiment, when the processor outputs the UI 1603 to the one area of the display area 1601, the processor may dispose the UI 1603 not to overlap the first area 1602. For example, when the UI 1603 is output to a second area 1605 overlapping the first area 1602, the processor may change the output position of the UI 1603 to a third area 1604 and may output the UI 1603 thereto.

The processor 120 may identify an area overlapping the first area 1602 and may output the user interface 1603 to the third area 1604 at an initial output time, based on the identified area. Accordingly, the processor 120 may prevent a portion of the multimedia content being viewed by a user from being blocked by the user interface 1603, thereby improving user convenience.

According to an embodiment, the processor 120 may determine a position in which the user interface 1603 is disposed by various methods. For example, the processor 120 may configure the coordinates of each vertex of the first area 1602 and may configure one of the vertices as an origin, thereby identifying coordinate values belonging to the first area 1602. The processor 120 may determine the position in which the user interface 1603 is disposed by not allowing the coordinate values of vertices of the boundary of the user interface 1603 to correspond to the identified coordinate values belonging to the first area 1602.

Figure 17:
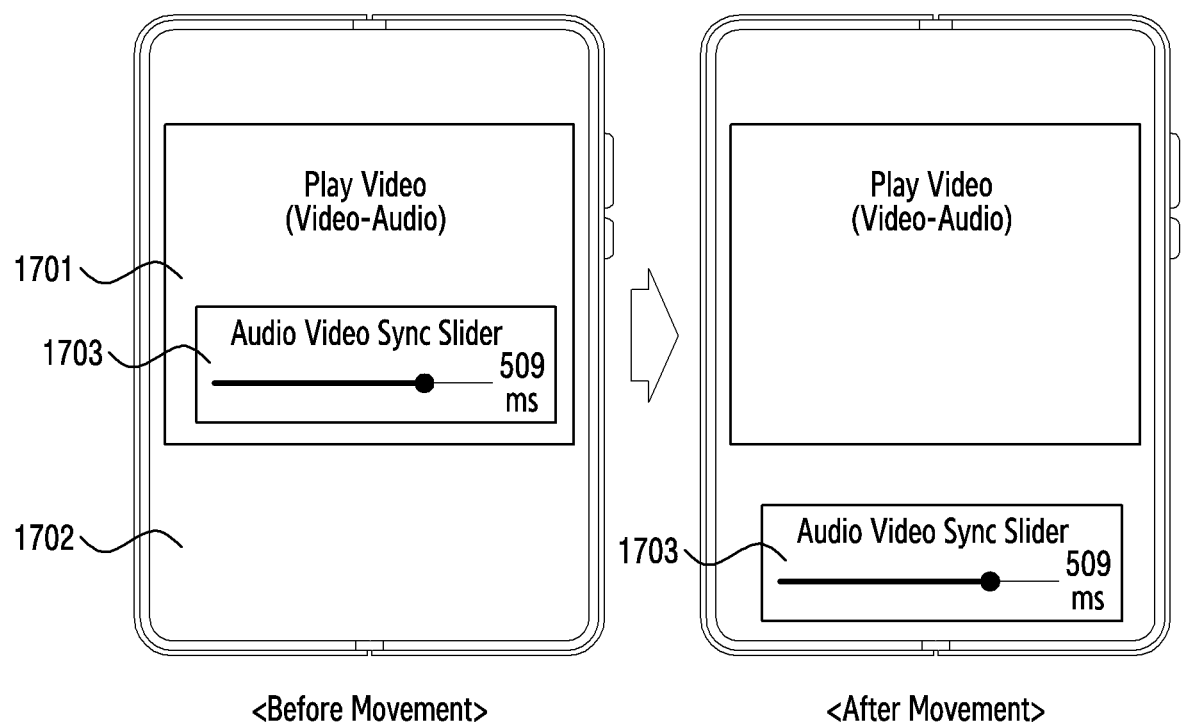
FIG. 17 illustrates outputting a UI on a display according to an embodiment.

FIG. 17 illustrates outputting a user interface on a display according to an embodiment.

Referring to FIG. 17, a processor 120 according to an embodiment may move a user interface 1703 to a second area 1702 so as not to overlap a first area 1701 in which multimedia content is being played on a display.

Figure 18:
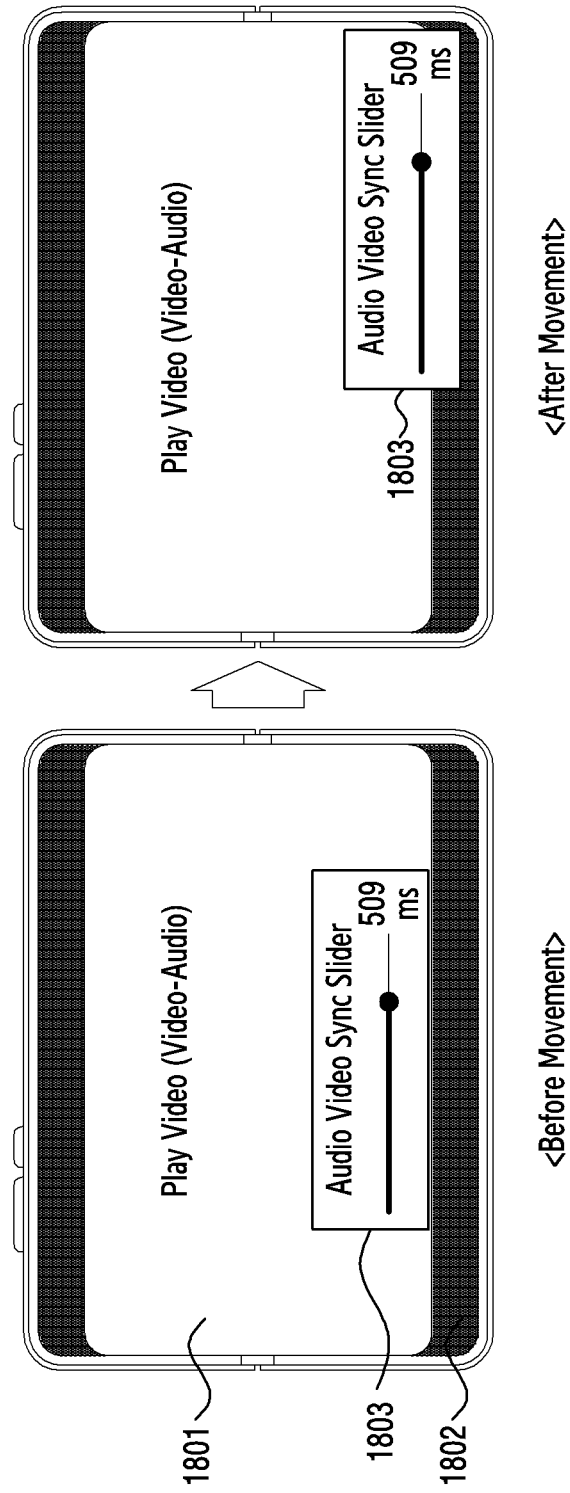
FIG. 18 illustrates a UI on a display according to an embodiment.

FIG. 18 illustrates outputting a user interface on a display according to an embodiment.

Referring to FIG. 18, a processor 120 according to an embodiment may move a user interface 1803 to a second area 1802 so as to minimally overlap with a first area 1801 in which multimedia content is being played on a display.

Figure 19:
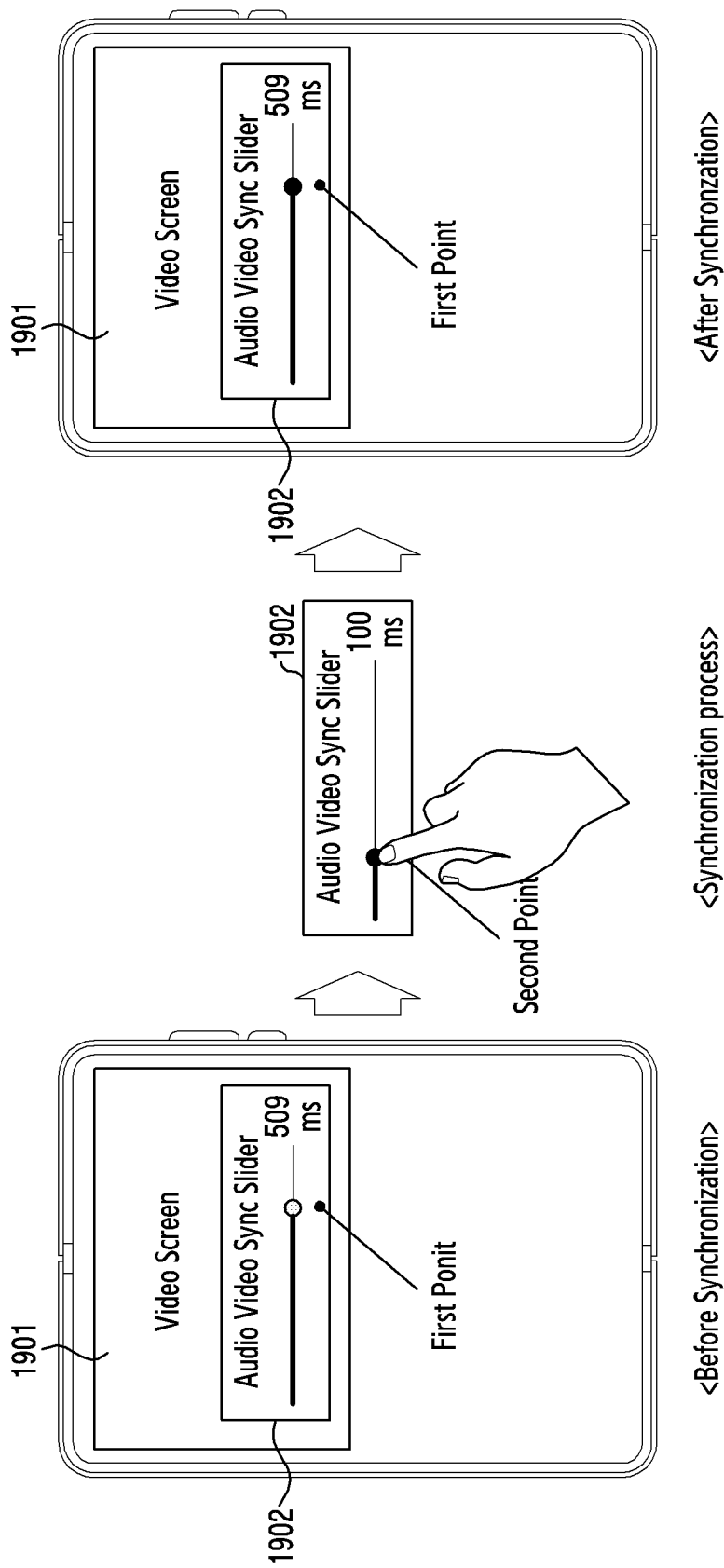
FIG. 19 illustrates a position of a synchronization control point and a time of multimedia content according to synchronization with respect to a UI according to an embodiment.

FIG. 19 illustrates a position of a synchronization control point and a time of multimedia content according to synchronization with respect to a user interface according to an embodiment.

Referring to FIG. 19, a processor 120 according to an embodiment may output multimedia content to a first area 1901 before synchronization and may output a user interface 1902 for synchronizing an audio signal and a video signal of the multimedia content to the first area 1901. In the user interface 1902, a synchronization control point may be positioned at a first point.

According to an embodiment, the processor 120 may move the synchronization control point positioned at the first point to a second point in response to a user input. In an embodiment, the processor 120 may change the video signal of the played multimedia content from a first time point corresponding to the first point to a second time point corresponding to the second point. Accordingly, the processor 120 may synchronize the audio signal and the video signal of the multimedia content, based on the second point.

According to an embodiment, after the synchronization, the processor 120 may output the audio signal and the video signal, synchronized based on the second point, from the first time point on a display. The processor 120 may prevent a user from manually returning to the first time point through a user input and playing the multimedia content after the synchronization, thereby improving usability of an application by the user.

Figure 20:
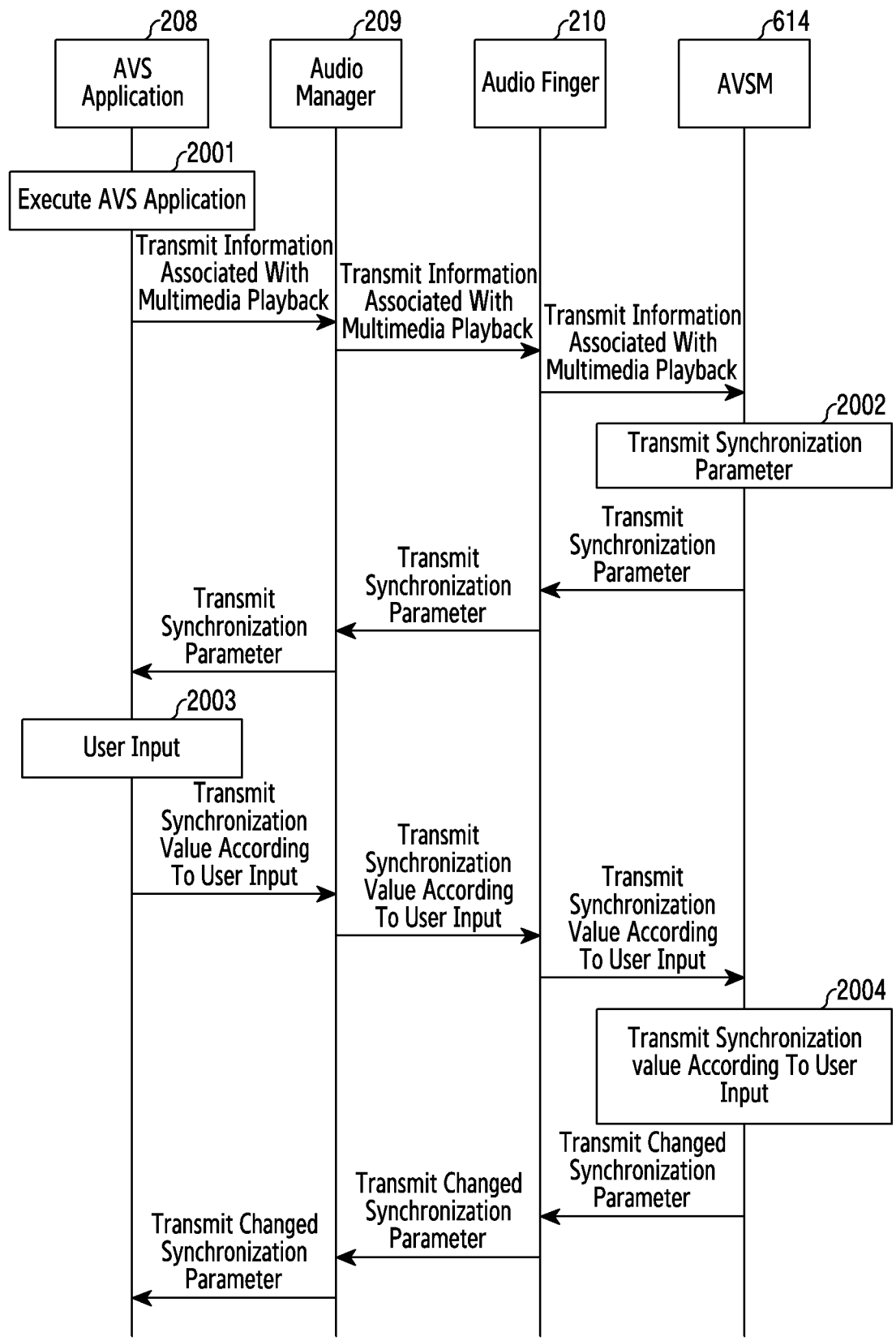
FIG. 20 is a signal flow diagram illustrating communication between an AVS application and an audio-video synchronization manager (AVSM) according to an embodiment.

FIG. 20 is a signal flow diagram illustrating communication between an AVS application and an AVSM according to an embodiment.

Referring to FIG. 20, in step 2001, an AVS application 208 may be executed in response to playback of multimedia content. Information associated with the playback of the multimedia content may be transmitted from the AVS application 208 to an AVSM 614 via an audio manager 209 and an audio flinger 210. In step 2002, the AVSM 614 may determine a synchronization parameter (e.g., a synchronization range, a recommended synchronization value, or a synchronization gap), based on the information associated with the playback of the multimedia content received from the AVS application 208. The determined synchronization parameter may be transmitted to the AVS application 208 through the audio manager 209 and the audio flinger 210.

In step 2003, the AVS application 208 may recognize a user input to a user interface.

In response to the user input, the AVS application 208 may transmit a synchronization value according to the user input to the AVSM 614 through the audio manager 209 and the audio flinger 210.

In step 2004, the AVSM 614 may store the synchronization value according to the user input in a memory 130 and may change the synchronization parameter, based on the synchronization value according to the user input. The AVSM 614 may transmit the changed synchronization parameter to the AVS application 208 via the audio manager 209 and the audio flinger 210.

Figure 21:
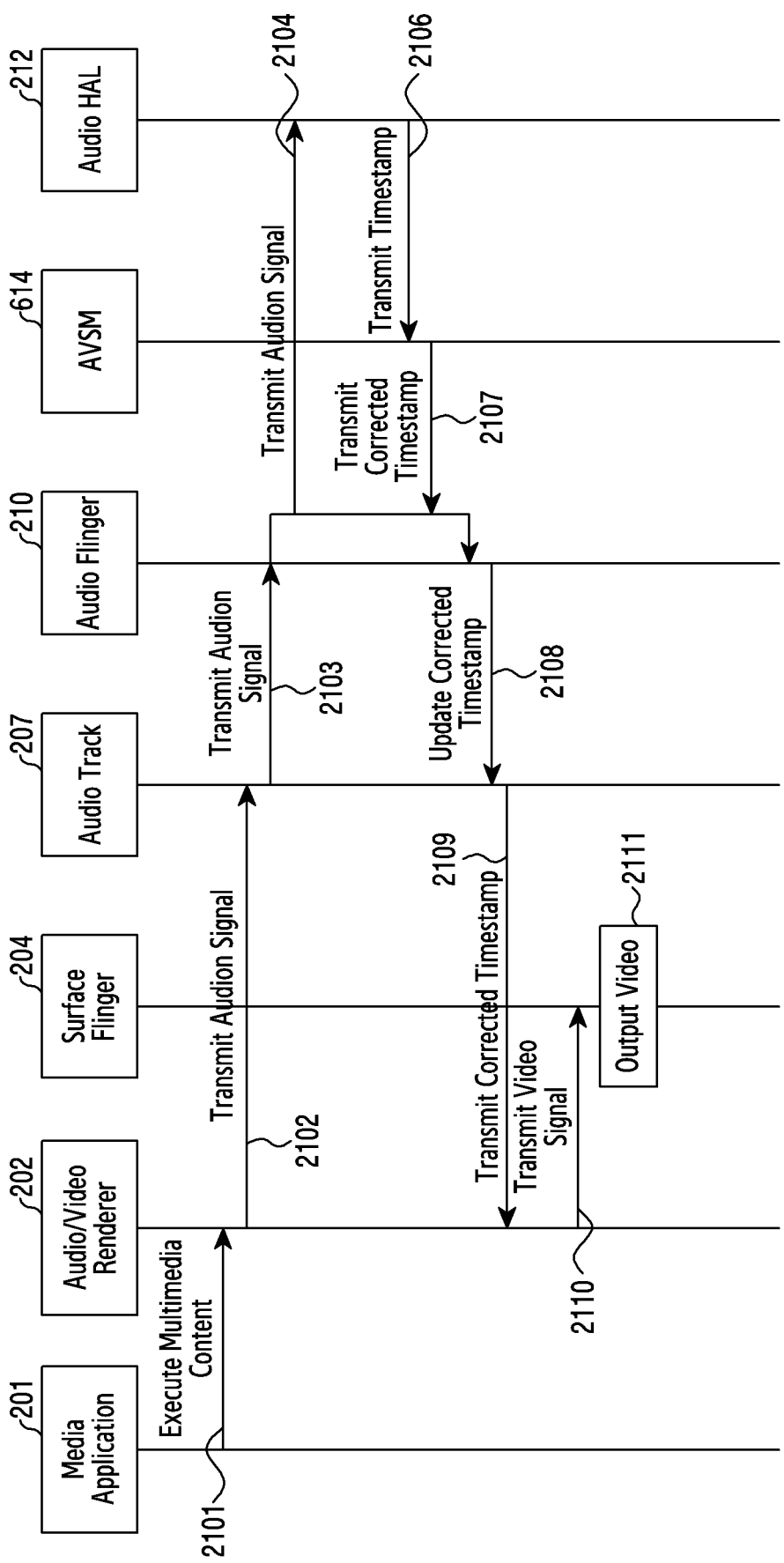
FIG. 21 is a signal flow diagram illustrating an operation of synchronizing audio and video signals of multimedia content played in a media application according to an embodiment.

FIG. 21 is a signal flow diagram illustrating an operation of synchronizing an audio signal and a video signal of multimedia content played in a media application according to an embodiment.

Referring to FIG. 21, in step 2101, a media application 201 may execute multimedia content in response to a user input. An audio/video renderer 202 may render an audio signal of the multimedia content.

In step 2102, the audio/video renderer 202 may transmit the rendered audio signal to an audio track 207. In step 2103, the audio track 207 may transmit the audio signal to an audio flinger 210, and the audio flinger 210 may apply a sound effect to the audio signal.

According to an embodiment, a timestamp may refer to information about the number of frames of which sound processing is completed in an audio HAL 212. The timestamp may be formed as a combination of a time at which playback is completed in the audio HAL 212 and the number of accumulated frames of which playback is completed in the audio HAL 212. The time at which the playback is completed may be expressed in various time units (e.g., nsec or msec), and the number of frames may be expressed as an integer value. The processor 120 may calculate a frame value completely processed in the audio HAL 212 in a specified time period using the timestamp and may synchronize the audio signal and the video signal of the multimedia content, based on the frame value. In an embodiment, the number of accumulated frames of which the playback is completed in the audio HAL 212 may vary according to a synchronization value according to a user input. For example, the processor 120 may identify the synchronization value according to the user input and may convert the synchronization value according to the user input from a time unit (e.g., msec) to a frame unit, based on the identified synchronization value. The processor 120 may add the converted synchronization value according to the user input to the number of accumulated frames of which the playback is completed in the audio HAL 212. Accordingly, the processor 120 may reflect the synchronization value according to the user input in the timestamp for synchronizing the audio signal and the video signal of the multimedia content.

In step 2104, the audio flinger 210 may transmit the audio signal to the audio HAL 212 at regular intervals. In step 2106, the audio HAL 212 may transmit a timestamp of the audio signal to the AVSM 614, the AVSM 614 may correct the transmitted timestamp according to a user input.

In step 2107, the AVSM 614 may transmit the corrected timestamp to the audio flinger 210. In step 2108, the audio flinger 210 may update the transmitted corrected timestamp to the audio track 207.

In step 2109, the audio track 207 may transmit the corrected timestamp to the audio/video renderer 202, and the audio/video renderer 202 may render the video signal, based on the received corrected timestamp. In step 2110, the audio/video renderer 202 may transmit the rendered video signal to a surface flinger 204.

In step 2111, the surface flinger 204 may output a video through a DDI controller and a display panel.

Figure 22:
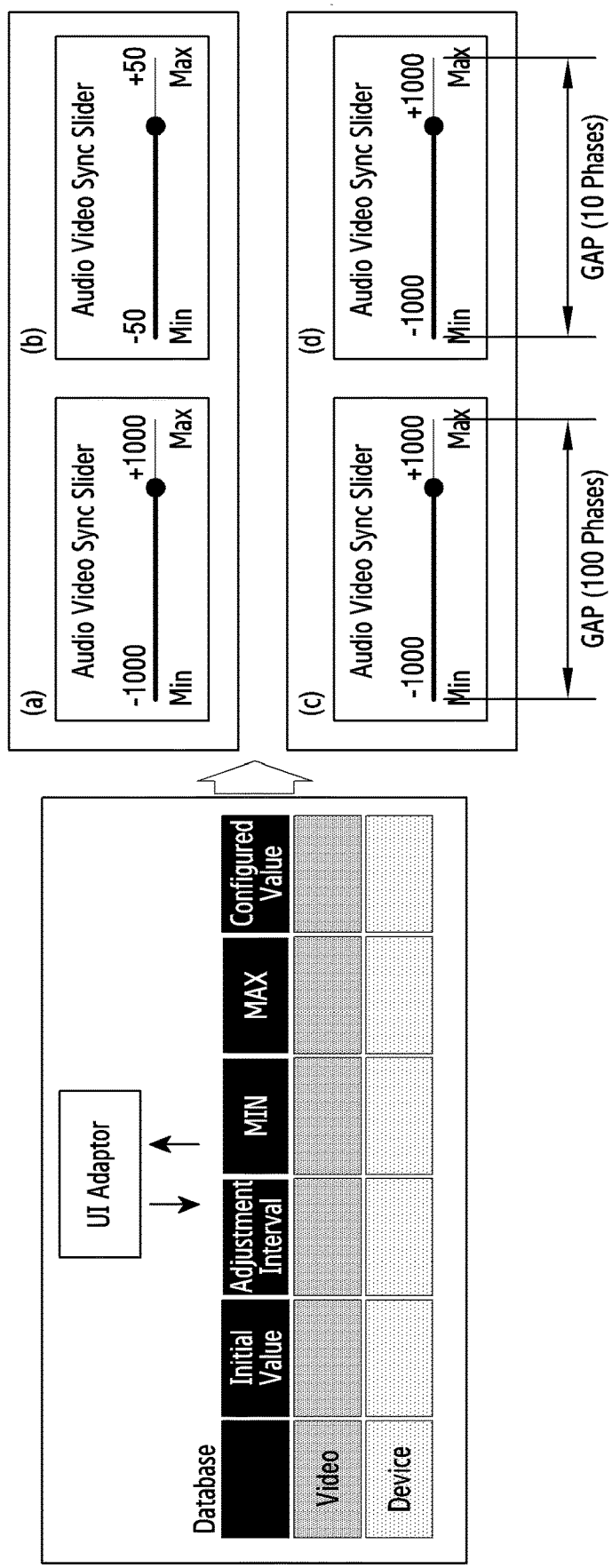
FIG. 22 illustrates UIs in which a synchronization parameter is displayed according to an embodiment.

FIG. 22 illustrates UIs in which a synchronization parameter is displayed according to an embodiment.

Referring to FIG. 22, in UI (a), a minimum synchronization value and a maximum synchronization value are displayed, wherein the minimum synchronization value is −1000 and the maximum synchronization value is 1000.

In UI (b), a minimum synchronization value and a maximum synchronization value are displayed, wherein the minimum synchronization value is −50 and the maximum synchronization value is 50 according to an embodiment.

Using UIs (a) and (b), an electronic device 101 may provide an optimized synchronization value, based on multimedia content, an application executing the multimedia content, and/or information about an external electronic device. For example, when a synchronization range is large according to characteristics of the multimedia content, the electronic device 101 may provide a synchronization range from −1000 to 1000 as in UI (a). However, when the synchronization range is small according to the characteristics of the multimedia content, the electronic device 101 may provide a synchronization range from −50 to 50 as in UI (b). Accordingly, the electronic device 101 may improve usability of an application by the user.

In UI (c), a minimum synchronization value, a maximum synchronization value, and a synchronization gap are displayed, wherein the minimum synchronization value is −1000, the maximum synchronization value is +1000, and the synchronization gap includes 100 phases according to an embodiment.

In UI (d), a minimum synchronization value, a maximum synchronization value, and a synchronization gap are displayed, wherein the minimum synchronization value is −1000, the maximum synchronization value is +1000, and the synchronization gap includes phases according to an embodiment.

Using UIs (c) and (d), the electronic device 101 may provide various synchronization gaps, based on the auditory sensitivity level of a user in consideration of auditory characteristics of the user. For example, when the auditory sensitivity level of the user is high, the electronic device 101 may provide a synchronization gap having 100 phases as in UI (c). However, when the auditory sensitivity level of the user is low, the electronic device may provide a synchronization gap having 10 phases as in UI (d). Accordingly, the electronic device 101 may improve usability of an application by the user.

Figure 23:
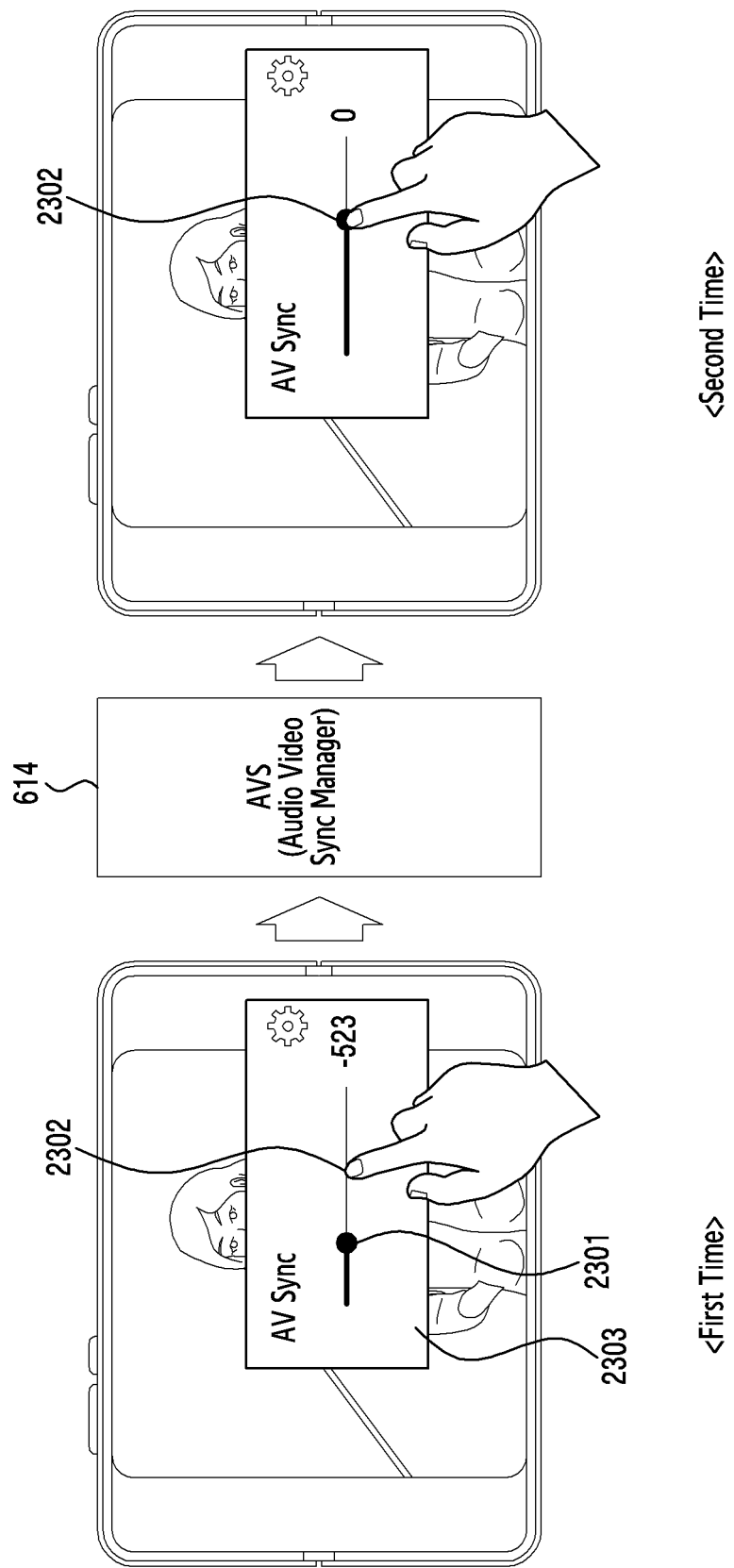
FIG. 23 illustrates a synchronization parameter displayed on a UI being changed based on a synchronization value according to a user input according to an embodiment.

FIG. 23 illustrates a synchronization parameter displayed on a UI being changed based on a synchronization value according to a user input according to an embodiment.

Referring to FIG. 23, a processor 120 may output a user interface 2303 in which a synchronization parameter is displayed at a first time point. When a user moves a synchronization control point disposed at a first point 2301 to a second point 2302, the processor 120 may identify a synchronization value according to a user input. The processor 120 may change a recommended synchronization value, based on the synchronization value according to the user input identified through an AVSM 614.

According to an embodiment, the user may play multimedia content through a media application with substantially the same electronic device at a second time point after the first time point. The processor 120 may dispose the synchronization control point at a position corresponding to the changed recommended synchronization value (e.g., a second point 2302) in response to playback of the multimedia content.

Figure 24:
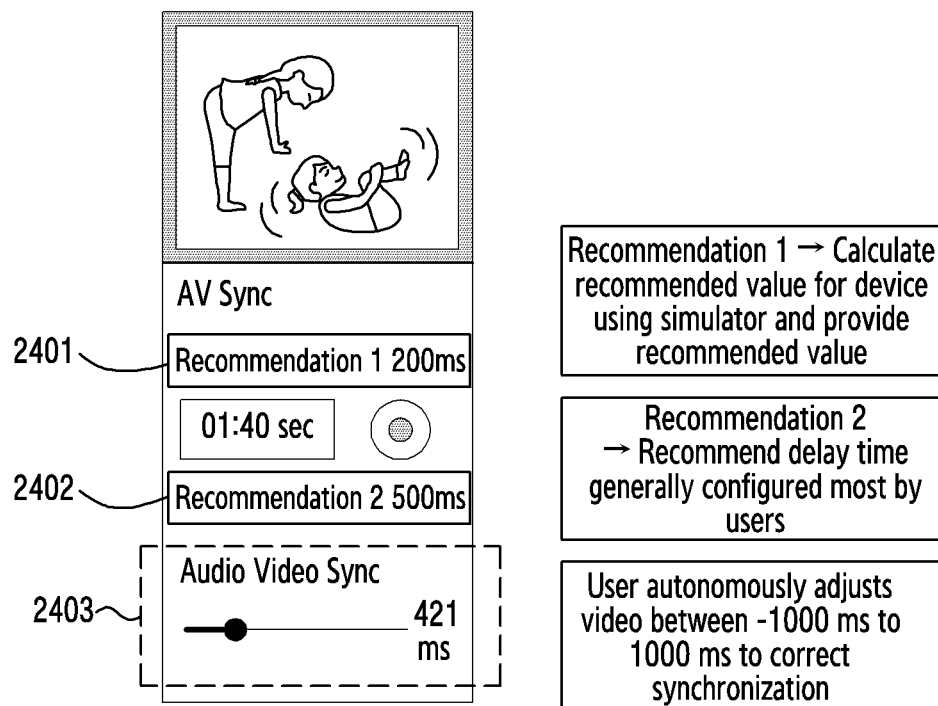
FIG. 24 illustrates synchronizing an audio signal and a video signal of multimedia content using a UT in which a plurality of recommended synchronization values are displayed according to an embodiment.

FIG. 24 illustrates a method for synchronizing an audio signal and a video signal of multimedia content using a user interface in which a plurality of recommended synchronization values is displayed according to an embodiment.

Referring to FIG. 24, a processor 120 according to an embodiment may display a plurality of recommended synchronization values on a user interface for synchronization, processor 120 may output a first recommended synchronization value 2401 and a second recommended synchronization value 2402 to the user interface. The first recommended synchronization value 2401 may be provided through a simulation, and the second recommended synchronization value 2402 may be provided by receiving a value generally configured by users from an external server.

When a minimum synchronization value (e.g., −1000 ms) and a maximum synchronization value (e.g., 1000 ms) are specified, a user may adjust synchronization of an audio signal and a video signal between the minimum synchronization value and the maximum synchronization value. The user may be provided with a plurality of recommended synchronization values and may adjust a synchronization value desired by the user according to personal characteristics of the user. Accordingly, user convenience may be improved.

Figure 25:
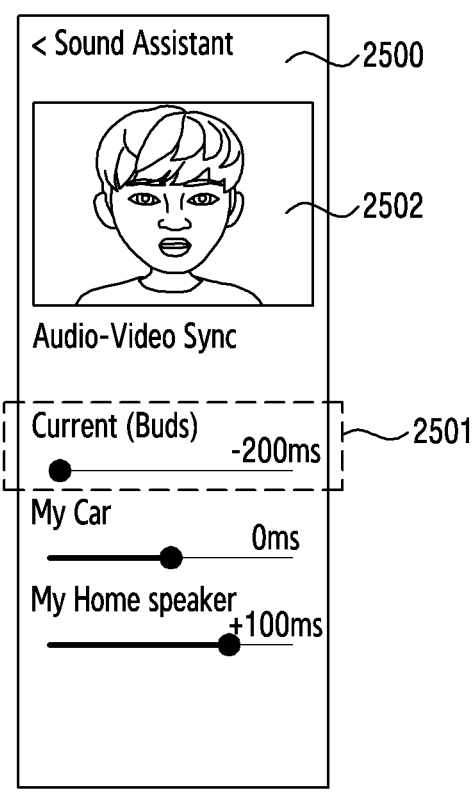
FIG. 25 illustrates an AVS application that provides a guide image for synchronization of an audio signal and a video signal according to an embodiment.

FIG. 25 illustrates an AVS application that provides a guide image for synchronization of an audio signal and a video signal according to an embodiment.

Referring to FIG. 25, a user may directly execute an AVS application 2500 to synchronize an audio signal and a video signal. The processor 120 may display a guide image 2502 for advising synchronization of an audio signal and a video signal in one area of an execution screen of the AVS application 2500. The processor 120 may display a user interface 2501 for synchronization of an external electronic device (e.g., a wireless earphone) currently connected to an electronic device 101 on the execution screen of the AVS application 2500. The user may match a video (e.g., a change in person's mouth shape) output of the guide image 2502 with an audio output through a direct user input. The processor 120 may synchronize an audio signal and a video signal of the guide image 2502 in response to the user input.

Figure 26:
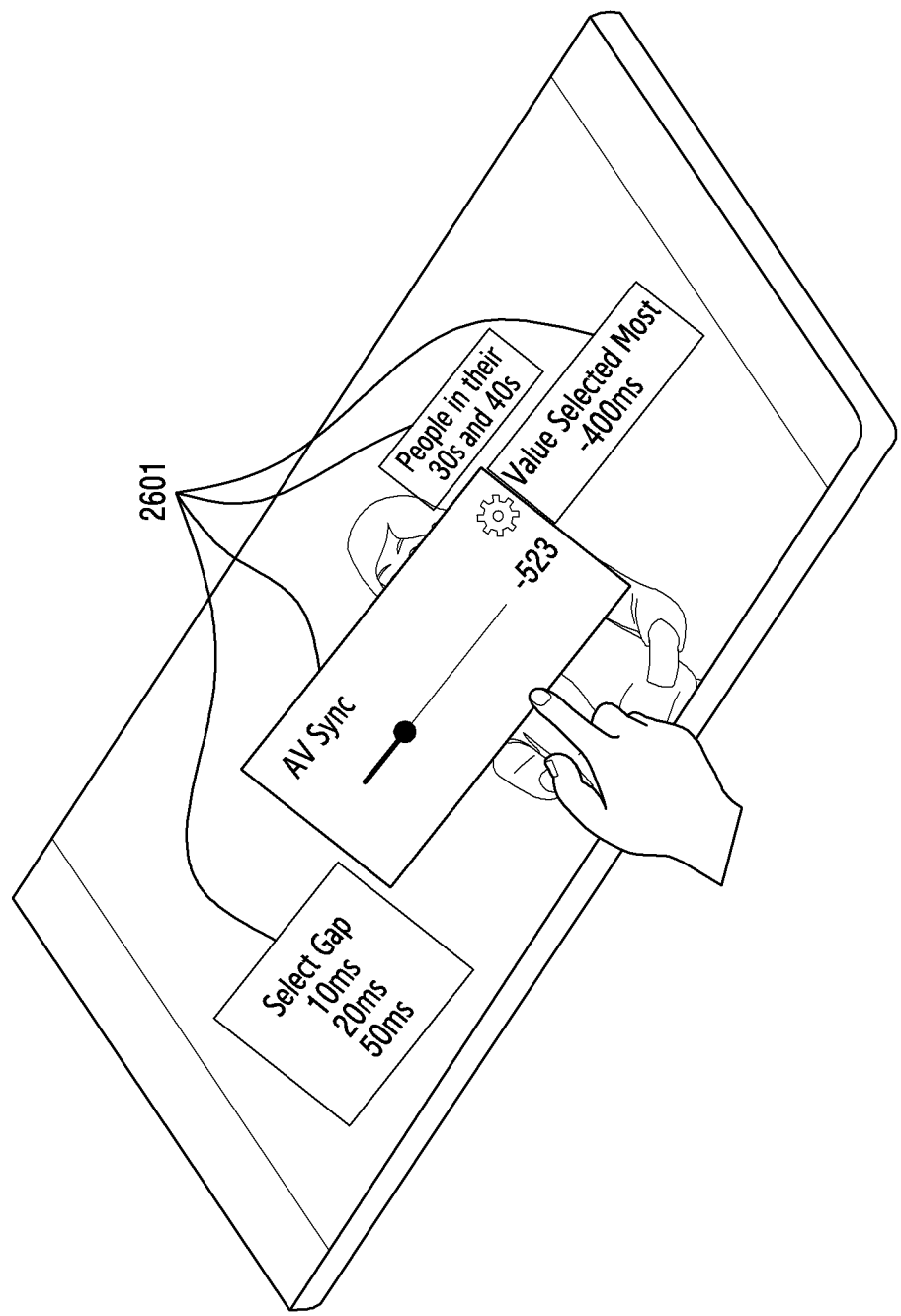
FIG. 26 illustrates recommending a synchronization parameter, based on an age group, according to an embodiment.

FIG. 26 illustrates recommending a synchronization parameter, based on an age group according to an embodiment.

Referring to FIG. 26, a user interface 2601 for synchronizing an audio signal and a video signal of multimedia content according to an embodiment. The processor 120 may provide a recommended synchronization value that is most commonly selected by a user's age group (e.g., people in their 30s and 40s), based on the user's age group. The processor 120 may provide various synchronization gaps (e.g., 10 ms, 20 ms, and 50 ms).

Figure 27:
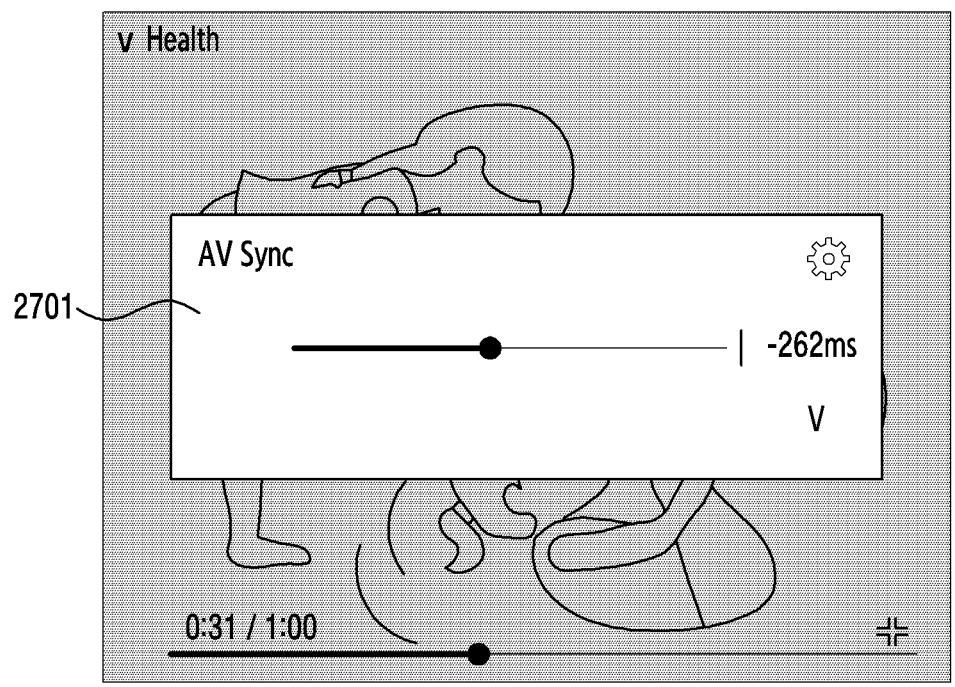
FIG. 27 illustrates a UI displaying a synchronization parameter according to an embodiment.

FIG. 27 illustrates a user interface displaying a synchronization parameter according to an embodiment.

Referring to FIG. 27, a processor 120 according to an embodiment may display a user interface 2701 for synchronizing an audio signal and a video signal of multimedia content on a display without interrupting playback of the multimedia content being displayed. Accordingly, the processor 120 may improve usability of an application.

Figure 28:
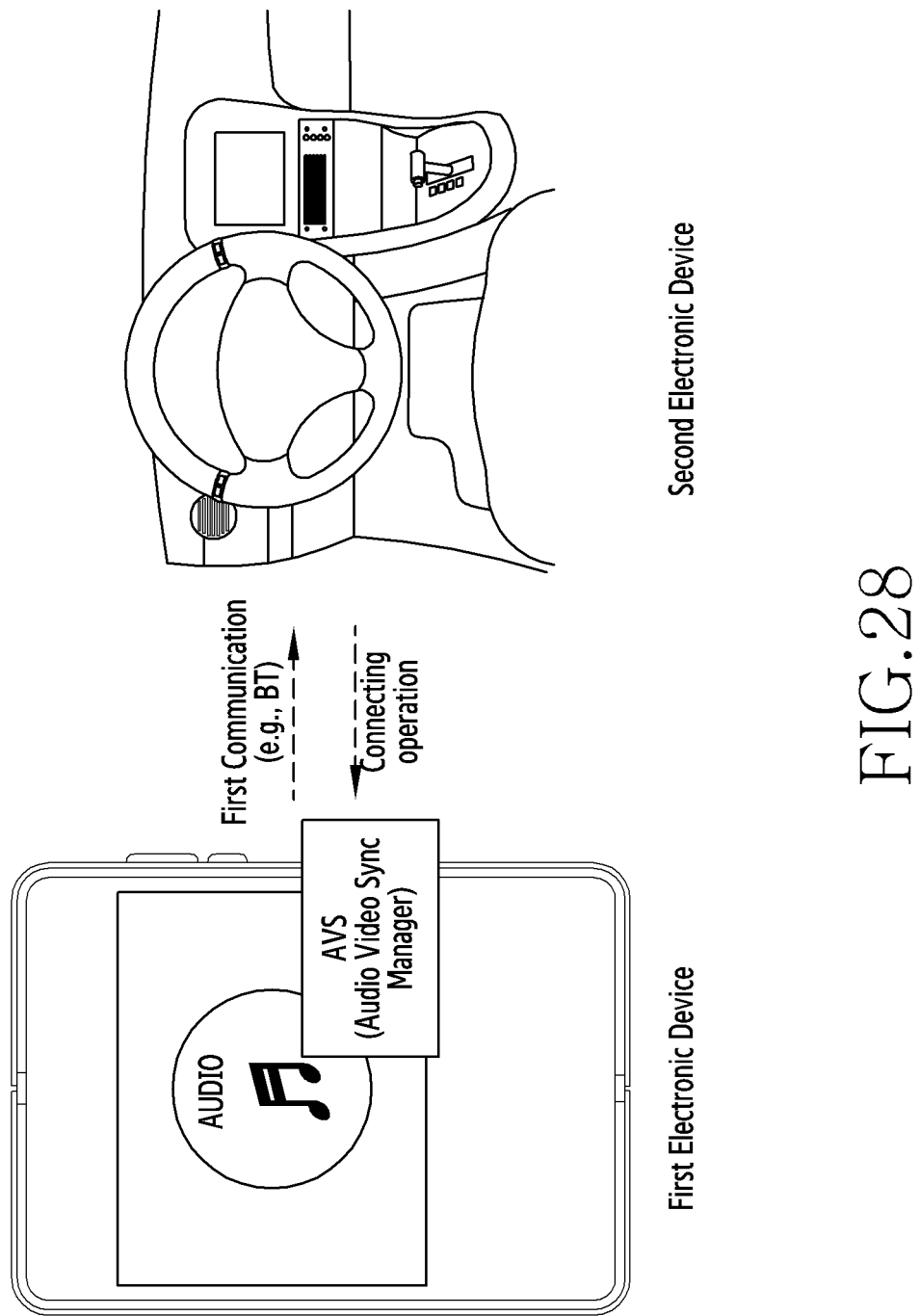
FIG. 28 illustrates connection of a first electronic device and a second electronic device according to an embodiment.

FIG. 28 illustrates connection of a first electronic device and a second electronic device according to an embodiment.

Referring to FIG. 28, a first electronic device (e.g., a mobile phone) may be connected with a second electronic device (e.g., a car) through a first communication method (e.g., Bluetooth). To execute multimedia content being executed by a media application of the first electronic device in the second electronic device, synchronization between an audio signal and a video signal may be required. For example, the first electronic device may transmit the audio signal of the multimedia content being executed to the second electronic device. In this case, a delay may occur in an operation of transmitting the audio signal. To prevent a signal mismatch between the audio signal and the video signal due to the delay, synchronization may be required.

Accordingly, the first electronic device (e.g., the mobile phone) may synchronize the audio signal and the video signal, based on information about the second electronic device (e.g., the car), information about the multimedia content, and/or information about the media application.

Figure 29:
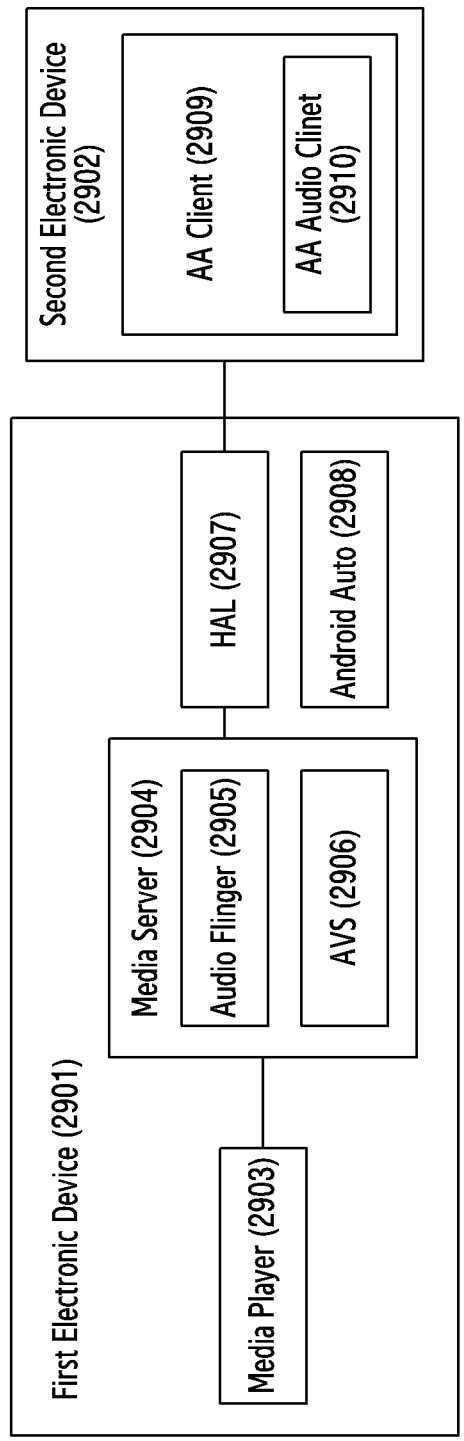
FIG. 29 illustrates a first electronic device and a second electronic device according to an embodiment.

FIG. 29 illustrates a first electronic device and a second electronic device, according to an embodiment.

Referring to FIG. 29, a first electronic device 2901 according to an embodiment may include a media player 2903. The media player 2903 may be connected to a media server 2904. The media player 2903 may transmit an audio signal of multimedia content being executed in the first electronic device 2901 to an HAL 2907 through an audio flinger 2905. The audio signal transmitted to the HAL 2907 may be transmitted to a second electronic device 2902 through Android Auto 2908. For example, when a connection for wireless communication is established between the first electronic device 2901 and the second electronic device 2902, Android Auto 2908 may transmit the audio signal of the multimedia content being executed in the first electronic device 2901 to an Android Auto (AA) client 2909 of the second electronic device 2902. The audio signal transmitted to the AA client 2909 may be transmitted to an AA audio client 2910. An AVS 2906 may synchronize the audio signal with respect to a video signal in response to a user input.

Figure 30:
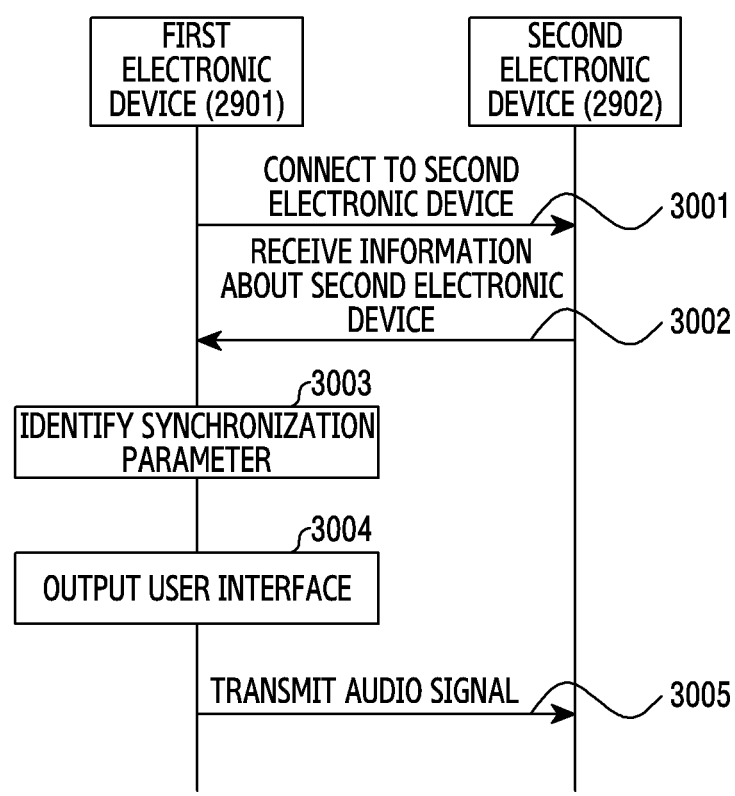
FIG. 30 is a signal flow diagram illustrating a method of synchronizing an audio signal and a video signal in a first electronic device and a second electronic device according to an embodiment.

FIG. 30 is a signal flow diagram illustrating an operation of synchronizing audio and video signals in a first electronic device and a second electronic device according to an embodiment.

Referring to FIG. 30, in step 3001, a first electronic device 2901 may establish a wireless connection with a second electronic device 2902. For example, the first electronic device 2901 and the second electronic device 2902 may be connected via a Bluetooth.

In step 3002, the first electronic device 2901, which may include a processor, and the processor of the first electronic device 2901 may receive information about the second electronic device 2902. Further, the processor may obtain information about a media application that plays multimedia content and/or information about the multimedia content.

In step 3003, the processor may identify a synchronization parameter, based on the information about the second electronic device 2902, the information about the media application, and/or the information about the multimedia content.

In step 3004, the processor may output a user interface displaying the synchronization parameter.

In step 3005, the processor may synchronize an audio signal with a video signal in response to a user input and may transmit the synchronized audio signal to the second electronic device 2902, e.g., via an Android Auto 2908.

Figure 31:
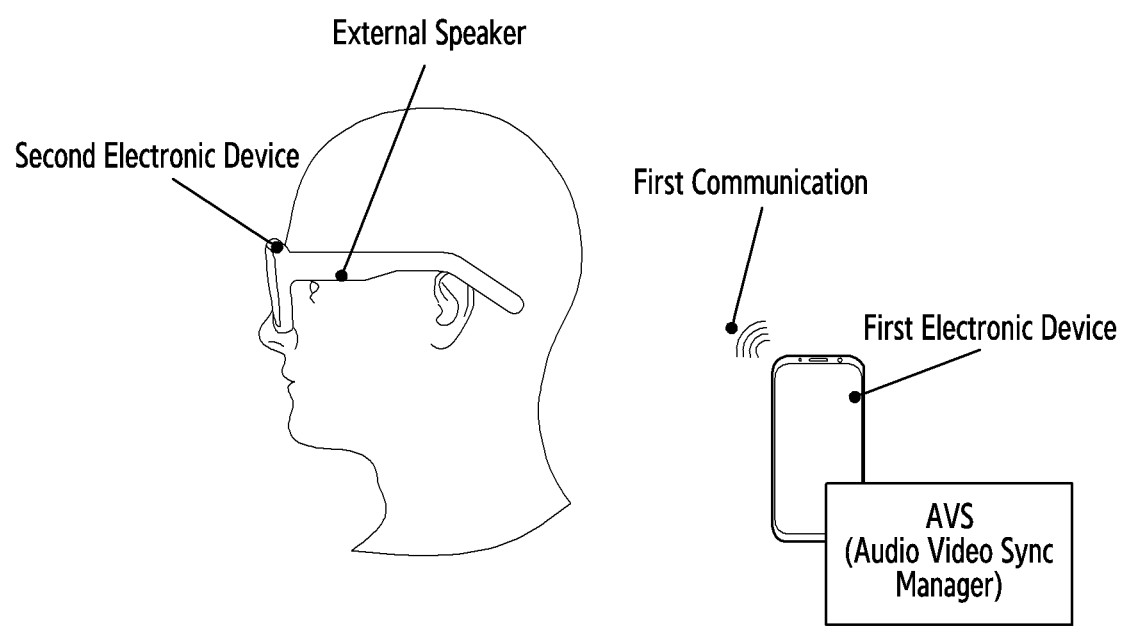
FIG. 31 illustrates connection of a first electronic device and a second electronic device according to an embodiment.

FIG. 31 illustrates connection of a first electronic device and a second electronic device according to an embodiment.

Referring to FIG. 31, a first electronic device (e.g., a mobile phone) according to an embodiment may be connected with a second electronic device (e.g., AR glasses) through a first communication method (e.g., Bluetooth). To play multimedia content being played by a media application of the first electronic device in the second electronic device, synchronization between an audio signal and a video signal may be required.

Accordingly, the first electronic device (e.g., the mobile phone) may synchronize the audio signal and the video signal, based on information about the second electronic device (e.g., the AR glasses), information about the multimedia content, and/or information about the media application.

Figure 32:
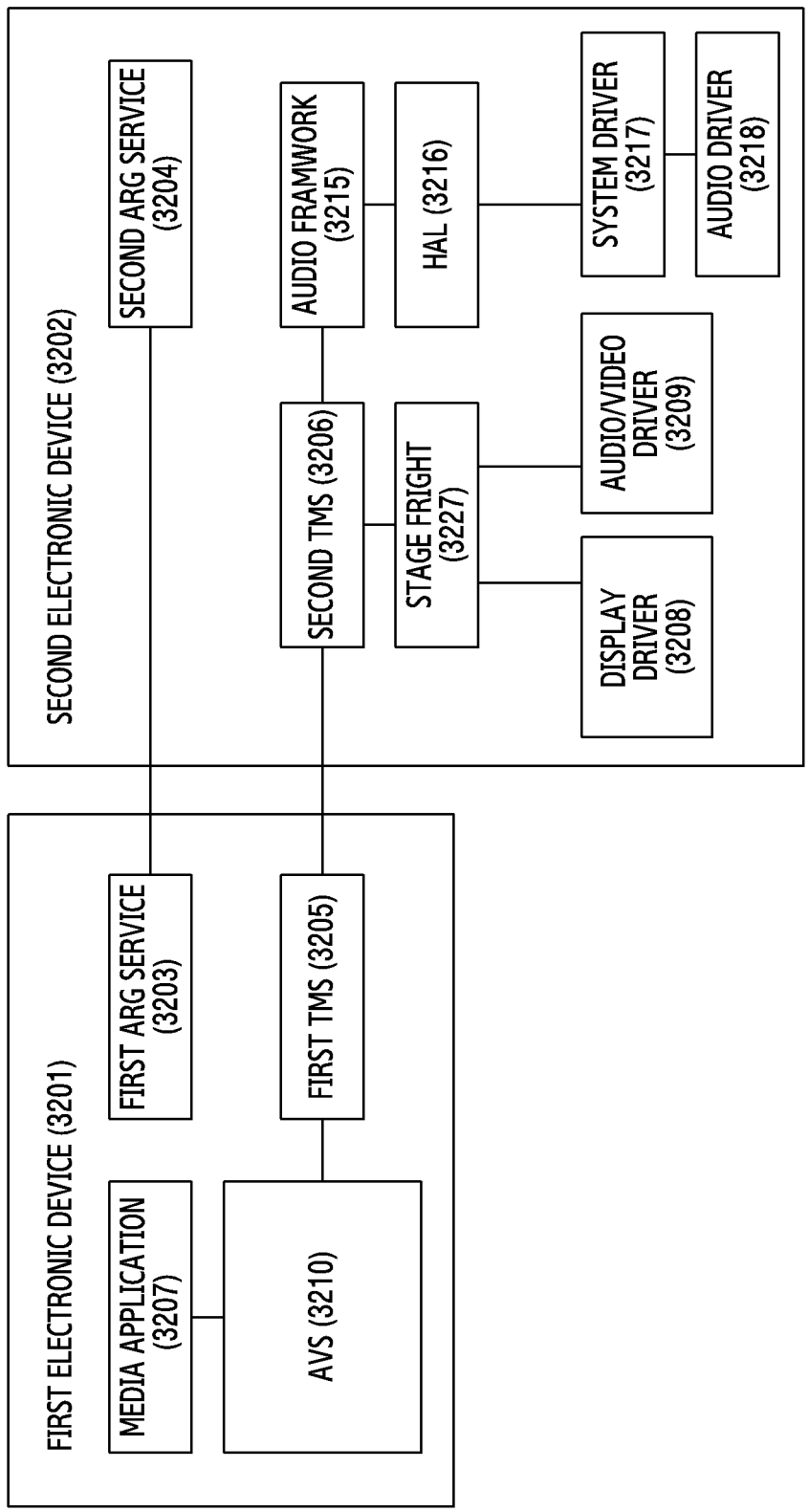
FIG. 32 illustrates a method for synchronizing an audio signal by an AVS between a first electronic device and a second electronic device according to an embodiment.

FIG. 32 illustrates a first electronic device and a second electronic device according to an embodiment.

Referring to FIG. 32, according to an embodiment, a first electronic device 3201 and a second electronic device 3202 may establish a connection for wireless communication. In an embodiment, a first AR glass (ARG) service 3203 may be connected to a second ARG service 3204. Through the connection between the first ARG service 3203 and the second ARG service 3204, the first electronic device 3201 and the second electronic device 3202 may receive a command signal to mutually transmit and/or receive data. Further, a first terminal mode server (TMS) 3205 may be connected to a second TMS 3206. Through the connection between the first TMS 3205 and the second TMS 3206, the first electronic device 3201 and the second electronic device 3202 may mutually transmit and/or receive an audio signal and a video signal of multimedia content.

According to an embodiment, a media application 3227 of the first electronic device 3201 may play the multimedia content in response to a user input. An AVS 3210 may synchronize the audio signal and the video signal of the played multimedia content and may transmit the synchronized audio signal and video signal to the first TMS 3205. In an embodiment, the second TMS 3206 may receive the synchronized audio signal and video signal from the first TMS 3205. The received video signal may be output to a display of the second electronic device 3202 through a stage fright 3227, a display driver 3208, and an audio/video driver 3209. The audio signal may be transmitted to an HAL 3216 through an audio framework 3215, and the HAL 3216 may transmit the audio signal to an audio driver 3218 through a system driver 3217.

An electronic device according to an embodiment may include a display and at least one processor 120 configured to be electrically connected to the display, wherein the at least one processor 120 may execute a media application 201, may play multimedia content through the media application 201, may obtain information associated with playback of the multimedia content, may identify a synchronization parameter for synchronizing an audio signal and a video signal of the multimedia content, based on the obtained information, may output a user interface (e.g., the user interface 1603 of FIG. 16) generated based on the obtained information and the synchronization parameter to the display, and may synchronize the audio signal and the video signal in response to a user input to the user interface 1603.

According to an embodiment, the at least one processor 120 may identify a synchronization value used to synchronize the audio signal and the video signal according to the user input, and may change the synchronization parameter, based on the synchronization value according to the user input.

According to an embodiment, the electronic device may further include a memory, wherein the memory may store the information associated with the playback of the multimedia content.

According to an embodiment, the information associated with the playback of the multimedia content may include at least one or a combination of two or more of information about an external electronic device, information about the application, and information about the multimedia content.

According to an embodiment, the synchronization parameter may include a synchronization range, a predetermined recommended synchronization value, and a synchronization gap.

According to an embodiment, the at least one processor 120 may obtain the recommended synchronization value by performing a simulation for synchronizing the audio signal and the video signal of the multimedia content, based on the information associated with the playback of the multimedia content.

According to an embodiment, the at least one processor 120 may output the multimedia content played through the application in a first area 1602 of the display, and may output the user interface 1603 in a second area 1605 of the display, which overlaps or does not overlap the first area 1602.

According to an embodiment, the user interface 1603 may include a control bar, and the synchronization parameter may be displayed on the control bar.

According to an embodiment, the user interface 1902 may include a control bar displaying the synchronization parameter, and the at least one processor 120 may move a synchronization control point positioned at a first point of the control bar to a second point in response to the user input, may change the video signal of the multimedia content from a first time point corresponding to the first point to a second time point corresponding to the second point, and may synchronize the audio signal and the video signal of the multimedia content, based on the second point.

According to an embodiment, the at least one processor may output the audio signal and the video signal, synchronized based on the second time point, from the first time point on the display.

An operating method of an electronic device including a display according to an embodiment may include: executing, by at least one processor 120 of the electronic device, an application; playing multimedia content through the application; obtaining information associated with playback of the multimedia content; identifying a synchronization parameter for synchronizing an audio signal and a video signal of the multimedia content, based on the obtained information; outputting a user interface generated based on the obtained information and the synchronization parameter to the display; and synchronizing the audio signal and the video signal in response to a user input to the user interface.

The operating method of the electronic device including the display according to an embodiment may include identifying a synchronization value used to synchronize the audio signal and the video signal according to the user input, and changing the synchronization parameter, based on the synchronization value according to the user input.

According to an embodiment, the information associated with the playback of the multimedia content may include at least one or a combination of two or more of information about an external electronic device, information about the application, and information about the multimedia content.

According to an embodiment, the synchronization parameter may include a synchronization range, a predetermined recommended synchronization value, and a value of a synchronization gap.

According to an embodiment, the at least one processor 120 may obtain the recommended synchronization value by performing a simulation for synchronizing the audio signal and the video signal of the multimedia content, based on the information associated with the playback of the multimedia content.

The operating method of the electronic device including the display according to an embodiment may include outputting the multimedia content played through the application in a first area of the display, and outputting the user interface in a second area 1605 of the display, which partially overlaps or does not overlap the first area 1602.

According to an embodiment, the user interface may include a control bar, and the synchronization parameter may be displayed on the control bar.

According to an embodiment, the user interface may include a control bar displaying the synchronization parameter, and the operating method of the electronic device including the display may include moving a synchronization control point positioned at a first point of the control bar to a second point in response to the user input, changing the video signal of the multimedia content from a first time point corresponding to the first point to a second time point corresponding to the second point, and synchronizing the audio signal and the video signal of the multimedia content, based on the second point.

The operating method of the electronic device including the display according to an embodiment may include outputting the audio signal and the video signal, synchronized based on the second point, from the first time point on the display.

A non-transitory computer-readable recording medium according to an embodiment may store instructions which, when executed by at least one processor, cause the at least one processor to perform configured operations, and the operations may include executing, by at least one processor 120 of an electronic device, an application, playing multimedia content through the application, obtaining information associated with playback of the multimedia content, identifying a synchronization parameter for synchronizing an audio signal and a video signal of the multimedia content, based on the obtained information, outputting a user interface generated based on the obtained information and the synchronization parameter to the display, and synchronizing the audio signal and the video signal in response to a user input to the user interface.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device, comprising:
a display;
at least one processor electrically connected to the display; and
memory storing instructions that, when executed by the at least one processor individually or collectively, cause the electronic device to,
execute an application for multimedia contents,
output, at a first time point, a first audio and a first video of the multimedia contents through the application based on a user input for the application,
obtain information associated with a play of the multimedia contents, wherein the information includes first information on a type of the application for the multimedia contents,
identify a range of time values for synchronizing a second audio and a second video of the multimedia contents, based on the first information on the type of the application,
display, on the display, a user interface (UI) indicating the range of the time values, and
synchronize the second audio and the second video, based on a first time value which is selected by a user from the range of the time values, wherein the synchronized second audio and the synchronized second video are outputted at a second time point after the first time point.

2. The electronic device of claim 1, wherein the instructions, when executed by the at least one processor individually or collectively, cause the electronic device to:
identify the first time value used to synchronize the second audio and the second video, and
determine a time value indicated to the user for synchronization as the first time value.

3. The electronic device of claim 1, wherein the memory stores the information associated with the play of the multimedia contents.

4. The electronic device of claim 1, wherein the information associated with the play of the multimedia contents further includes at least one of second information on an external electronic device, or third information on a type of the multimedia contents.

5. The electronic device of claim 1, wherein the instructions, when executed by the at least one processor individually or collectively, cause the electronic device to:
obtain a time value indicated to the user for synchronization by performing a simulation for synchronizing the second audio and the second video, based on the information associated with the play of the multimedia contents.

6. The electronic device of claim 1, wherein the instructions, when executed by the at least one processor individually or collectively, cause the electronic device to:
output the multimedia contents played through the application in a first area of the display, and
output the UI in a second area of the display, which partially overlaps or does not overlap the first area.

7. The electronic device of claim 1, wherein the UI includes a control bar, and
wherein the instructions, when executed by the at least one processor individually or collectively, cause the electronic device to:
move a control point for synchronization positioned at a first point of the control bar to a second point in response to a user input, and change an outputted video of the multimedia contents from a video corresponding to the first point to a video corresponding to the second point,
wherein an audio and a video of the multimedia contents are synchronized, based on the second point.

8. The electronic device of claim 7, wherein the instructions, when executed by the at least one processor individually or collectively, cause the electronic device to:
output the audio and the video which are synchronized based on the second point.

9. An operating method of an electronic device including a display, the method comprising:
executing an application for multimedia contents;
outputting, at a first time point, a first audio and a first video of the multimedia contents through the application based on a user input for the application;
obtaining information associated with a play of the multimedia contents, wherein the information includes first information on a type of the application for the multimedia contents;
identifying a range of time values for synchronizing a second audio and a second video of the multimedia contents, based on the first information on the type of the application;
displaying, on the display, a user interface (UI) indicating the range of the time values; and
synchronizing the second audio and the second video based on a first time value which is selected by a user from the range of the time values,
wherein the synchronized second audio and the synchronized second video are outputted at a second time point after the first time point.

10. The method of claim 9, further comprising:
identifying the first time value used to synchronize the second audio and the second video; and
determining a time value indicated to the user for synchronization as the first time value.

11. The method of claim 9, wherein the information associated with the play of the multimedia contents further includes at least one of second information on an external electronic device, or third information on a type of the multimedia contents.

12. The method of claim 9, further comprising:
obtaining a time value indicated to the user for synchronization by performing a simulation for synchronizing the second audio and the second video, based on the information associated with the play of the multimedia contents.

13. The method of claim 9, further comprising:
outputting the multimedia contents played through the application in a first area of the display; and
outputting the UI in a second area of the display, which partially overlaps or does not overlap the first area.

14. The method of claim 9, wherein the UI includes a control bar, and
wherein the method further comprises:
moving a control point for synchronization positioned at a first point of the control bar to a second point in response to a user input;
changing an outputted video of the multimedia contents from a video corresponding to the first point to a video corresponding to the second point; and
wherein an audio and a video of the multimedia contents are synchronized, based on the second point.

15. The method of claim 14, comprising:
outputting the audio and the video which are synchronized based on the second point.

16. A non-transitory computer-readable recording medium that stores instructions which, when executed by at least one processor, cause the at least one processor to perform operations comprising:
executing an application for multimedia contents;
outputting, at a first time pint, a first audio and a first video of the multimedia contents through the application based on a user input for the application;
obtaining information associated with a play of the multimedia contents, wherein the information includes first information on a type of the application for the multimedia contents;
identifying a range of time values for synchronizing a second audio and a second video of the multimedia contents, based on the first information on the type of the application;
displaying, on a display, a user interface (UI) indicating the range of the time values; and
synchronizing the second audio and the second video based on a first time value which is selected by a user from the range of the time values,
wherein the synchronized second audio and the synchronized second video are outputted at a second time point after the first time point.

17. The electronic device of claim 1, wherein the range of the time values includes a minimum time value, a maximum time value, and a time value indicated to the user for synchronization, and
wherein the minimum time value, the maximum time value, and the time value indicated to the user are identified based on the type of the application for the multimedia contents.

18. The electronic device of claim 17, wherein the UI includes a control bar, and
wherein the minimum time value, the maximum time value and the time value indicated to the user are displayed on the control bar.

19. The method of claim 9, wherein the range of the time values includes a minimum time value, a maximum time value, and a time value indicated to the user for synchronization, and
wherein the minimum time value, the maximum time value, and the time value indicated to the user are identified based on the type of the application for the multimedia contents.

20. The method of claim 19, wherein the UI includes a control bar, and
wherein the minimum time value, the maximum time value and the time value indicated to the user are displayed on the control bar.

* * * * *